(12) United States Patent (10) Patent No.: US 8,229,490 B2
Hayashi et al. (45) Date of Patent: Jul. 24, 2012

(54) HAND-OFF CONTROL METHOD IN RADIO COMMUNICATION SYSTEM

(75) Inventors: Rumiko Hayashi, Kawasaki (JP); Shiro Mazawa, Fujisawa (JP); Toshiyuki Saito, Kyotanabe (JP)

(73) Assignee: Hitachi, Ltd., Tokyo (JP)

( * ) Notice: Subject to any disclaimer, the term of this patent is extended or adjusted under 35 U.S.C. 154(b) by 1021 days.

(21) Appl. No.: 12/175,605

(22) Filed: Jul. 18, 2008

(65) Prior Publication Data

US 2009/0093253 A1 Apr. 9, 2009

(30) Foreign Application Priority Data

Oct. 4, 2007 (JP) ................................. 2007-260773

(51) Int. Cl.
*H04W 36/00* (2009.01)
*H04M 1/00* (2006.01)
*H04B 7/00* (2006.01)

(52) U.S. Cl. ......................... 455/522; 455/436; 455/517

(58) Field of Classification Search .................. 455/436, 455/438, 522, 517; 370/328, 329, 331
See application file for complete search history.

(56) References Cited

U.S. PATENT DOCUMENTS

| | | | |
|---|---|---|---|
| 7,245,594 B1 | 7/2007 | Esteves et al. | |
| 7,873,383 B2 | 1/2011 | Shimizu et al. | |
| 8,009,595 B2 | 8/2011 | Lindoff et al. | |
| 2003/0223396 A1* | 12/2003 | Tsai et al. | 370/342 |
| 2004/0022213 A1* | 2/2004 | Choi et al. | 370/332 |
| 2005/0108615 A1* | 5/2005 | An et al. | 714/776 |
| 2007/0287462 A1* | 12/2007 | Gorokhov et al. | 455/439 |
| 2010/0002654 A1* | 1/2010 | Lindoff et al. | 370/332 |

FOREIGN PATENT DOCUMENTS

| | | |
|---|---|---|
| JP | 2004-515932 | 5/2004 |
| JP | 2006-319520 | 11/2006 |
| WO | WO 01/89162 | 11/2001 |
| WO | WO 2006/063842 | 6/2006 |
| WO | WO 2007/023786 | 3/2007 |

OTHER PUBLICATIONS

High Rate Packet Data Air Interface Specification, 3G[[S C.S0024-B V1.0, pp. 10-104-10-165.
U.S. Appl. No. 11/592,568, filed Mar. 22, 2007, Esteves et al.
U.S. Appl. No. 11/778,585, filed Nov. 15, 2007, Esteves et al.
3GPP2 C.S0024-B, cdma2000 High Rate Packet Data Air Interface Specification, 3rd Generation Partnership Project 2, Version 2.0, Mar. 2007.

* cited by examiner

*Primary Examiner* — Wesley Kim
(74) *Attorney, Agent, or Firm* — Antonelli, Terry, Stout & Kraus, LLP.

(57) ABSTRACT

A hand-off control method (FIG. 4) for suppressing reverse radio wave interference between radio access terminals and for accelerating hand-off, in which when a base station of greatest forward reception power has changed from a BTS1 to a BTS2 in a forward link, the radio access terminal (AT) alters the ID of a designated communication-destination base station to the BTS2 in an R-CQICH transmitted cyclically, and it makes a hand-off request after having increased transmission power of the R-CQICH a fixed quantity (403-406). The BTS1 does not transmit an FLAB and data. The BTS2 receives the R-CQICH (406) and succeeds in demodulation, thereby to recognize that the BTS2 has been designated as the communication-destination base station, and it transmits (407) an FLAB after execution and completion of a hand-off process. When the AT has received the FLAB (407) from the designated communication-destination base station BTS2, it transmits (408) the R-CQICH in which the communication-destination base station is designated as the BTS2, in a next R-CQICH transmission cycle, after having returned the transmission power of the R-CQICH (414).

5 Claims, 27 Drawing Sheets

POWER CONTROL ALGORITHM OF R-CQICH (FORWARD LINK)

DIAGRAM OF SYSTEM

CONFIGURATION OF RADIO ACCESS TERMINAL

CONFIGURATION OF RADIO BASE STATION

FLOW CHART OF "AT" IN FIRST EMBODIMENT (FORWARD LINK)

FLOW CHART OF "AT" IN FIRST EMBODIMENT (REVERSE LINK)

FLOW CHART OF "AT" IN SECOND EMBODIMENT (FORWARD LINK)

FLOW CHART OF "AT" IN SECOND EMBODIMENT (REVERSE LINK)

FLOW CHART OF "AT" IN THIRD EMBODIMENT (FORWARD LINK)

FLOW CHART OF "AT" IN THIRD EMBODIMENT (REVERSE LINK)

POWER CONTROL ALGORITHM OF R-CQICH (FORWARD LINK)

FLOW CHART OF "AT" IN FOURTH EMBODIMENT (REVERSE LINK)

HAND-OFF CONTROL METHOD IN RADIO COMMUNICATION SYSTEM

BACKGROUND OF THE INVENTION

1. Field of the Invention

The present invention relates to a hand-off control method in a radio communication system, and more particularly to a hand-off control method in a radio communication system for controlling the reverse-link radio wave interference between radio access terminals and accelerating hand-off.

2. Description of the Related Art

In a mobile radio communication system, it is indispensable to realize hand-off which is a process for switching the base station of a communication destination in accordance with the movement of a radio access terminal.

In the 1xEV-DO system in which a radio access terminal selects a communication destination, the radio access terminal selects a base station of the best radio quality on the basis of reception power levels from base stations, and it transmits the information of the radio quality and the information of the selected base station by using a dedicated channel called "DRC (Data Rate Control)". It is a hand-off request that the radio access terminal alters the selected base station. When the base station of a hand-off destination designated as a new communication destination receives the hand-off request, a hand-off process is executed. In order to accelerate hand-off, therefore, it becomes important to shorten a time period which is expended until the base station of the hand-off destination receives the hand-off request.

Here, in a case where a sector having the best quality of a forward link and a sector having the best quality of a reverse link are different, the sector having the best quality of the forward link is selected as the hand-off-destination base station. However, a long time is expended on the reception of a reverse signal, with the result that a long time might be expended on the hand-off. As a technique for shortening the time period which is expended until the hand-off-destination base station receives the hand-off request, Non-patent Document 1 as follows has introduced a mechanism according to which, in a case where the base station information has been altered by the DRC channel, the transmission power of the DRC channel is increased a fixed quantity for a predetermined fixed time period, thereby to enhance a reception characteristic.

[Non-patent Document 1] 3gpp2, C. S0024B ver 1.0, cdma2000 High Rate Packet Data Air Interface Specification (corresponding pages: 10-104 to 10-125, and 10-137 to 10-165).

SUMMARY OF THE INVENTION

In the prior-art technique, means for amplifying the transmission power of the dedicated channel having the hand-off information is employed for realizing the hand-off acceleration. The power amplification, however, forms a factor for the increase of interference power for any other radio access terminal.

Since the amplification quantity of the transmission power in the prior-art technique is fixed, the amplification quantity of the transmission power of the dedicated channel must be set somewhat large for the hand-off acceleration, irrespective of the discrepancy of actual environments. This poses the problem that the interference of the reverse link to be inflicted upon any other radio access terminal enlarges to the corresponding extent.

Besides, since the period of the transmission power amplification in the prior-art technique is fixed, the transmission power of the dedicated channel remains heightened even after the completion of the hand-off, in a case where the set value of the amplification quantity is excessively large. This poses the problem that the interference of the reverse link as is inflicted upon any other radio access terminal continues unnecessarily.

In order to solve the excess of a period for which interference is inflicted upon any other radio access terminal, the transmission power amplification of a dedicated channel having a hand-off instruction signal is stopped upon the completion of hand-off. Concretely, when at least one packet has been received on a forward traffic channel from a hand-off destination, or when an Ack (acknowledgement) to a hand-off request has been received, the amplification of the transmission power of the dedicated channel having the hand-off instruction signal is stopped.

In order to reduce a quantity which inflicts the interference upon any other radio access terminal, the amplification quantity of the transmission power of the dedicated channel having the hand-off instruction signal is increased with time from the start of the hand-off till the completion thereof.

According to the first solving means, there is provided a hand-off control method in a radio system, wherein a radio access terminal periodically measures a reception quality of a forward link in the forward link, the radio access terminal cyclically notifies communication-destination base station identification information of a base station which is designated in the forward link, to the base station by using a first specified channel, after transmission power of the first specified channel has been set at power which is a sum between transmission power of a pilot channel and first predetermined power, and hand-off of the forward link is performed when the base station designated anew has received a first specified channel; comprising the steps of:

allowing the radio access terminal to alter the communication-destination base station identification information to a second base station, in the first specified channel transmitted cyclically, and to transmit the first specified channel for making a request for the hand-off, after the transmission power of the first specified channel has been set at power which is a sum among the transmission power of the pilot channel, the first power and second predetermined power, when the base station of greatest forward reception power has changed from a first base station to the second base station as a result of the measurement of forward reception power levels of signals received from a plurality of base stations in the forward link;

allowing the first base station to receive the first specified channel and to judge that the communication-destination base station identification information disagrees, so that the first base station does not transmit a block of the forward link or an acknowledgement response to the first specified channel;

allowing the second base station to receive the first specified channel and to recognize that the second base station has been designated as a communication-destination base station, because of the communication-destination base station identification information of its own, so that the second base station executes a hand-off process and transmits the block of the forward link or the acknowledgement response to the first specified channel; and allowing the radio access terminal to judge that the transmission of the first specified channel containing the hand-off request has been successful, when the radio access terminal has received the block of the forward link or the acknowledgement response to the first specified channel, from the designated second base station, and to transmit the first specified channel in which the communication-destination base station identification information is designated as the second base station, in a next transmission cycle of the first specified channel, after the transmission power of the first specified channel has been returned to the power which is the sum between the transmission power of the pilot channel and the first power.

According to the second solving means, there is provided a hand-off control method in a radio system, wherein a radio access terminal cyclically notifies a data quantity to be transmitted in a reverse link and communication-destination base station identification information of a base station which is designated in the reverse link by the radio access terminal, to the base station in the reverse link, by using a second specified channel, after transmission power of the second specified channel has been set at power which is a sum between transmission power of a pilot channel and first predetermined power, and hand-off of the forward link is performed when the base station designated anew has received the second specified channel; comprising the steps of:

allowing the radio access terminal to alter the communication-destination base station identification information to a second base station, in the second specified channel transmitted cyclically, and to transmit the second specified channel for notifying a communication-destination base station to the base station and making a request for the hand-off, after the transmission power of the second specified channel has been set at power which is a sum among the transmission power of the pilot channel, the first power and second predetermined power, when the base station of greatest reverse reception power has changed from a first base station to the second base station as a result of the measurement of reverse reception power levels of signals received from a plurality of base stations in the reverse link;

allowing the first base station to receive the second specified channel and to judge that the communication-destination base station identification information disagrees, so that the first base station does not transmit a block of the reverse link or an acknowledgement response to the second specified channel;

allowing the second base station to receive the second specified channel and to recognize that the second base station has been designated as a communication-destination base station, because of the communication-destination base station identification information of its own, so that the second base station executes a hand-off process and transmits the block of the reverse link or the acknowledgement response to the second specified channel; and allowing the radio access terminal to judge that the transmission of the second specified channel containing the hand-off request has been successful, when the radio access terminal has received the block of the reverse link or the acknowledgement response to the second specified channel, from the designated second base station, and to transmit the second specified channel in which the communication-destination base station identification information is designated as the second base station, in a next transmission cycle of the second specified channel, after the transmission power of the second specified channel has been returned to the power which is the sum between the transmission power of the pilot channel and the first power.

In accordance with the invention, the stabilization and acceleration of hand-off and the reduction of interferences in reverse radio links can be provided to base stations and radio access terminals.

DESCRIPTION OF THE PREFERRED EMBODIMENTS

1. System

Figure 1:
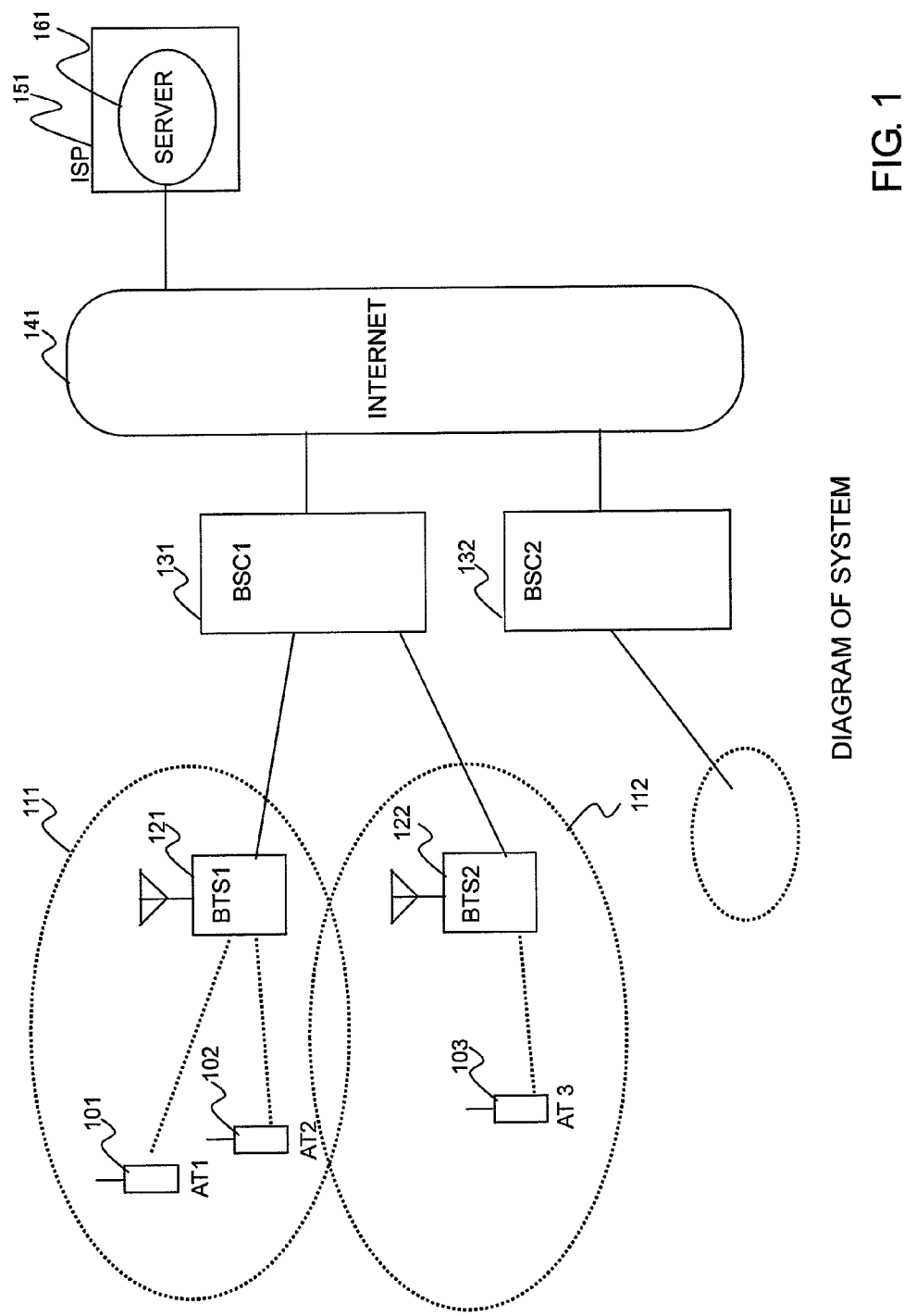
FIG. 1 is a diagram for explaining the configuration of the whole communication network which includes a radio communication system applying the present invention, and the Internet.

The ensuing embodiments will be described on the basis of the UMB (Ultra Mobile Baseband; C. S0084), which is under study in the 3gpp2 as a next-generation system realizing a still higher speed and a still wider band, by way of example. However, the present invention is not limited to the UMB, but it is applicable to various schemes.

The UMB is being standardized as the next-generation system of 1xEV-DO. In the UMB, both reverse/forward links are based on OFDMA (Orthogonal Frequency Division Multiple Access), and a reverse communication of 70 Mbps and a forward communication of 260 Mbps are possible. There will be explained rate control methods and hand-off information items in the forward/reverse links in the UMB as are required for describing the embodiments of the invention.

In the forward link, a radio access terminal measures the reception quality of the forward link periodically, so as to select a base station with which the radio access terminal is to communicate in the forward link. The information of the base station is used as one of the modulation/demodulation encryption keys of an R-CQICH (Reverse Channel Quality Indicator Channel), thereby to be notified to the base station. In a case where the base station designated in the R-CQICH has changed, the hand-off of the forward link is performed when a base station designated anew receives the R-CQICH. In order to accelerate the hand-off, the radio access terminal increases the transmission power of the R-CQICH for a fixed period when the designated base station has been altered.

In the reverse link, the radio access terminal notifies a data quantity to be transmitted by the reverse link, to the base station by using an R-REQCH (Reverse Request Channel). Besides, the R-REQCH has the function of designating the base station with which the radio access terminal is to communicate in the reverse link. Results obtained by measuring the reception quality information items of reverse links in the respective base stations are delivered to the radio access terminal by an F-PQICH (Pilot Quality Channel), and the radio access terminal designates the base station of good reverse reception quality as the communication-destination base station on the basis of the delivered information items. The radio access terminal uses the ID of the designated destination base station as one of the modulation/demodulation encryption keys of the R-REQCH, thereby to notify the designated destination to the base station. In a case where the designated base station has changed, the base station designated anew receives the R-REQCH, thereby to perform the hand-off of the reverse link. In order to accelerate the hand-off, the radio access terminal increases the transmission power of the R-REQCH for a fixed period when the designated base station has been altered.

In the UMB, means for realizing the high-speed hand-off operations of the reverse link and the forward link based on the dedicated channels is provided as stated above, whereas means for optimizing a reverse power control at the time of the hand-off in real time is not provided. Consequently, there are posed such problems that, at the time of the hand-off, a long time is required before data can be received at the base station of the hand-off destination, and that power remains high in spite of successful reception, so the interference of the reverse radio links occurs.

Therefore, radio communication control techniques based on the technology being studied in the UMB will be described in the ensuing embodiments.

2. Configuration

First of all, the configuration of the whole network which includes a radio communication system applying the invention will be described.

FIG. 1 is a configurational diagram of the whole communication network which includes the radio communication system applying the invention, the Internet, and a wired communication system.

As shown in FIG. 1, in the network in this embodiment, the radio communication system is connected to the Internet. In such a network, the radio access terminal AT1-101 of the radio communication system, for example, performs communications through a base station (BTS: Base station Transceiver Subsystem) 121 within a reception area 111, and it accesses a server 161 within an Internet service provider (IPS: Internet Service Provider) 151 on the Internet 141, through a base station controller (BSC: Base Station Controller) 131.

Figure 2:
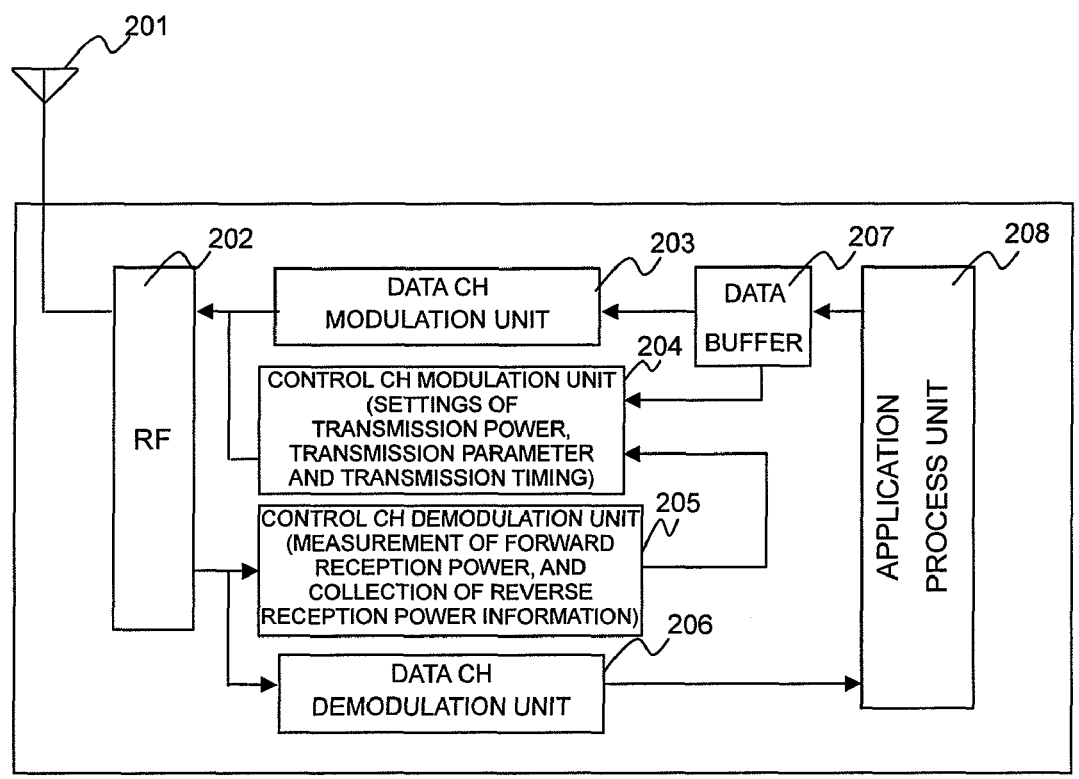
FIG. 2 is a diagram for explaining the configuration of a radio access terminal (AT) in an embodiment of the invention.

FIG. 2 is a block diagram of the radio access terminal in the embodiment of the invention.

As shown in FIG. 2, the radio access terminal includes an antenna 201, an RF unit 202, a data channel (Ch) modulation unit 203, a control Ch modulation unit 204, a control Ch demodulation unit 205, a data Ch reception unit 206, a data buffer 207, and an application process unit 208. The antenna 201 transmits and receives radio waves to and from the base station, and converts them into radio frequency signals. The RF unit 202 modulates and demodulates the radio frequency signals, and converts them into baseband signals of low frequencies. The data channel (Ch) modulation unit 203 modulates transmission data and converts them into baseband signals. The control Ch modulation unit 204 accepts, for example, reverse/forward reception quality information items (the intensity of a forward reception signal, the quality information of reverse power, etc.) and communication-destination base station information items from the control Ch demodulation unit 205, it computes and sets the transmission power and/or transmission cycle of a control Ch, and it modulates the control information items by using the ID of the communication-destination base station as part of an encryption key and converts them into baseband signals. The control Ch demodulation unit 205 measures the intensity (power) of the forward reception signal and demodulates the reception signal by way of example, and it derives the control information items containing the quality information of the reverse power, and the communication-destination base station information. The data Ch demodulation unit 206 demodulates and decrypts the reception signal so as to derive reception data. The application process unit 208 processes an application in cooperation with the data buffer 207 which temporarily buffers the transmission data.

Here, a data quantity stored in the data buffer 207 is notified to the control Ch modulation unit 204, and it is notified to the base station by using an R-REQCH. Besides, the control Ch demodulation unit 205 collects the intensity results of reverse reception power levels measured by the respective base stations, from among the received control information items, it selects the base station of the greatest reverse reception power as the communication destination of a reverse link, and it notifies the information of the base station (containing the ID) to the control Ch modulation unit 204. The information of the communication destination is notified to the base station by using the ID of the designated communication-destination base station as part of the modulation encryption key of the R-REQCH.

The transmission power of the R-REQCH (transmission power of a REQCH) is as in the following Formula 1 in the control Ch modulation unit 204:

$$\text{Transmission power of } REQCH = \text{Transmission power of Pilot } CH + REQCH \text{ Gain Base} \quad \text{(Formula 1)}$$

where
Pilot CH: pilot channel, and
REQCH Gain Base: gain base of REQCH.

Besides, the control Ch demodulation unit 205 measures the power intensities of the signals of forward links as received from the plurality of base stations, and it selects the base station of the greatest reception power as the communication-destination base station of the forward link. The information of the communication-destination base station (containing the ID thereof) is notified to the control Ch modulation unit 204, and it is notified to the base station by using the ID of the communication-destination base station as part of the demodulation encryption key of an R-CQICH. The transmission power of the R-CQICH (transmission power of a CQICH) is set as in the following Formula 2 in the control Ch modulation unit 204:

$$\text{Transmission power of } CQICH = \text{Transmission power of Pilot } CH + CQICH \text{ Gain Base} \quad \text{(Formula 2)}$$

where CQICH Gain Base: gain base of CQICH.

Figure 3:
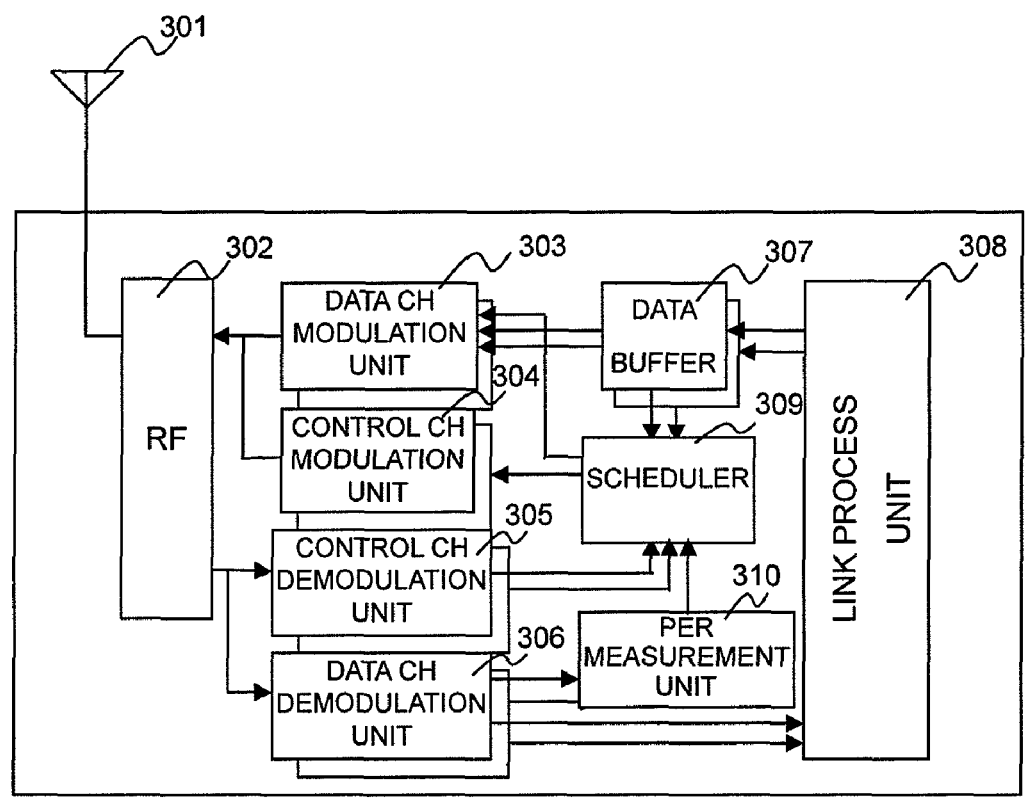
FIG. 3 is a diagram for explaining the configuration of a base station in an embodiment of the invention.

FIG. 3 is a block diagram of the base station in the embodiment of the invention.

As shown in FIG. 3, the base station includes an antenna 301, an RF unit 302, a data Ch modulation unit 303, a control Ch modulation unit 304, a control Ch demodulation unit 305, a data Ch reception unit 306, a data buffer 307, a link process unit 308, a scheduler 309, and a PER measurement unit 310. The antenna 301 transmits and receives radio waves to and from the radio access terminal within an area, and converts them into radio frequency signals. The RF unit 302 modulates and demodulates the radio frequency signals, and converts them into baseband signals of low frequencies. The data Ch modulation unit 303 modulates transmission data and converts them into baseband signals. The control Ch modulation unit 304 modulates control information items containing the intensity measurement result of the reverse reception signal of every radio access terminal, and converts them into baseband signals. The control Ch demodulation unit 305 measures the intensity of the reverse reception signal of every radio access terminal, and it demodulates the reception signal so as to derive the control information items. The data Ch reception unit 306 demodulates and decrypts the reception signal so as to derive reception data. The data buffer 307 temporarily buffers transmission data. The link process unit 308 transmits data to a base station controller. The scheduler 309 determines a transmission rate from the received information of a control Ch, etc. The PER measurement unit 310 calculates a packet error rate from a data demodulation result in the data Ch demodulation unit 306. Here, the control Ch modulation units 304, the control Ch demodulation units 305 and the data buffers 307 are prepared in a number corresponding to all the radio access terminals within the area, and the data Ch modulation units 303 and the data Ch demodulation units 306 are prepared in a number corresponding to the number of the radio access terminals assigned by the scheduler 309. The scheduler 309 determines forward/reverse transmission rates and bandwidths which are to be assigned to the radio access terminal, on the basis of a forward buffer quantity notified by the data buffer 307, a reverse buffer quantity and forward/reverse signal qualities obtained as received results in the control Ch demodulation unit 305, and the packet error rate information notified by the PER measurement unit 310.

3. Power Control (1) First Embodiment (Forward Link)

Figure 4:
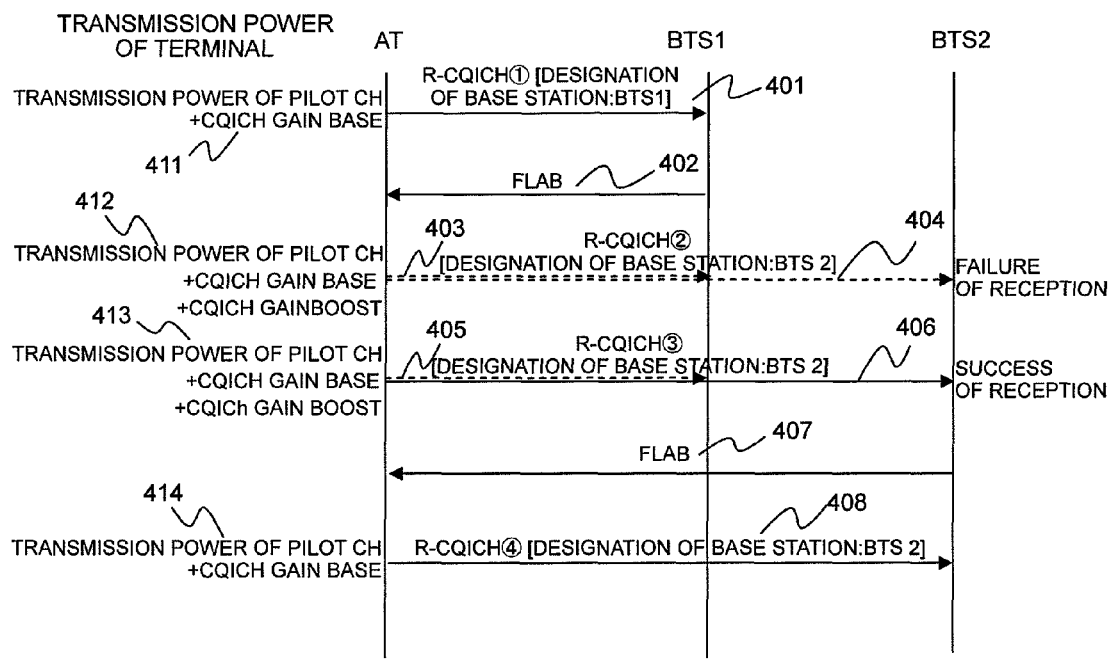
FIG. 4 is a diagram for explaining the power control algorithm of an R-CQICH in the first embodiment of the invention.

FIG. 4 is a diagram for explaining the power control algorithm of an R-CQICH in the first embodiment of the invention.

Figure 5:
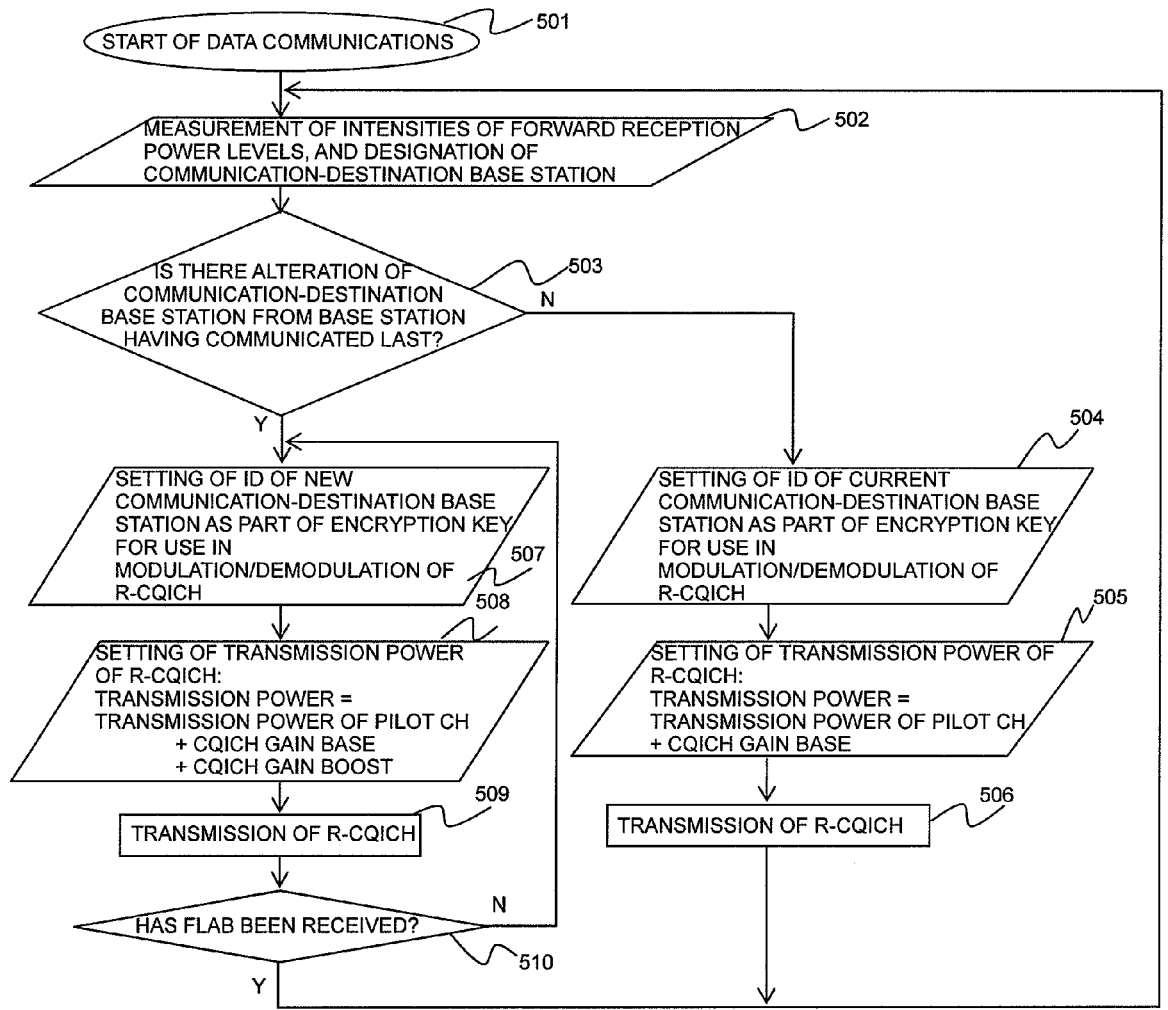
FIG. 5 is a flow chart of the operation of the AT as corresponds to the power control algorithm of the R-CQICH in the first embodiment of the invention.

FIG. 5 is a flow chart of the operation of an AT corresponding to the power control algorithm of the R-CQICH in the first embodiment of the invention.

Figure 6:
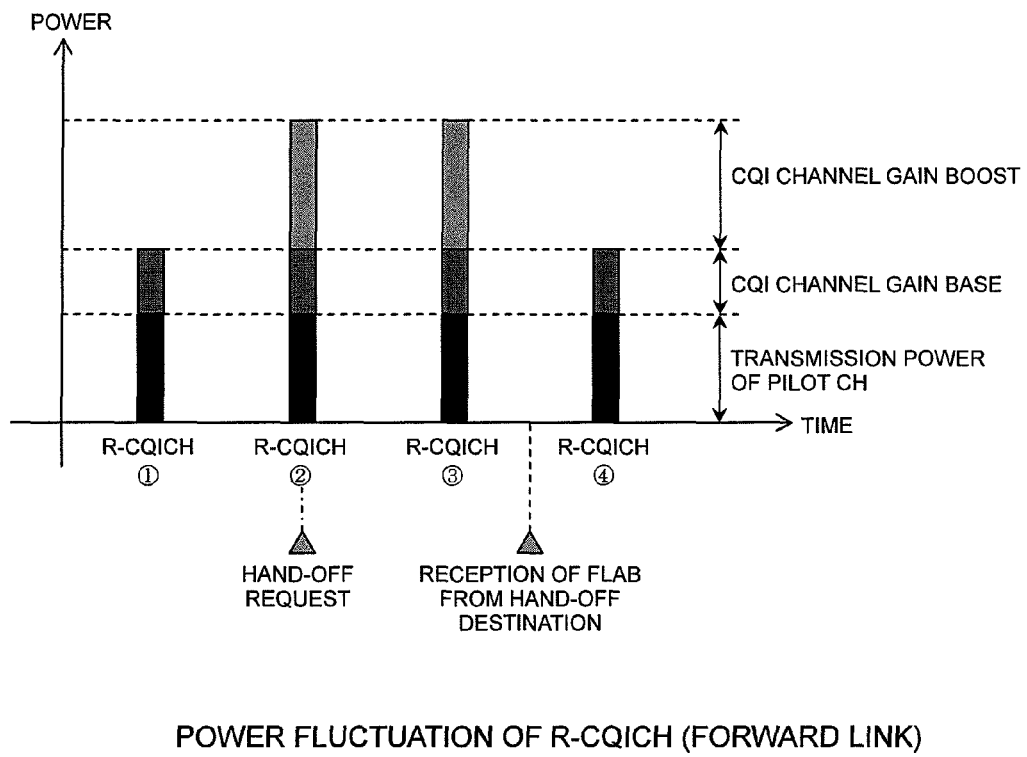
FIG. 6 is a diagram for explaining power changes which correspond to the power control algorithm of the R-CQICH in the first embodiment of the invention.

FIG. 6 is a diagram for explaining power changes corresponding to the power control algorithm of the R-CQICH in the first embodiment of the invention.

Now, the power control algorithm of the R-CQICH will be explained in conjunction with FIGS. 4, 5 and 6. This example supposes a case where the radio access terminal (AT) hands-off to a base station (BTS2) during its communications with a base station (BTS1).

In the forward link, the radio access terminal (AT) receives control channels from a plurality of base stations, through the antenna 201 and the RF unit 202, whereby data communications are started (501). The control Ch demodulation unit 205 measures reception power levels, and it designates the base station (BTS1) of the greatest reception power as the communication-destination base station (BTS1) of the forward link (502). In this case, there is not any alteration of a communication-destination base station from a base station having communicated last (503). Therefore, the control Ch modulation unit 204 bestows the ID of the designated communication-destination base station as part of a modulation encryption key, on the R-CQICH transmitted cyclically, and then transmits the R-CQICH, thereby to notify the communication destination to the base station (401, and 504). The transmission power of the R-CQICH (transmission power of the CQICH) on this occasion is set as in Formula 3 by the control Ch modulation unit 204 (411, and 505), and it is transmitted through the RF unit 202 and the antenna 201 (506).

$$\text{Transmission power of } CQICH = \text{Transmission power of Pilot } CH + CQICH \text{ Gain Base} \quad \text{(Formula 3)}$$

The base station (BTS1) receives the R-CQICH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an FLAB (Forward Link Assignment Block) from the scheduler 309 and through the control Ch modulation unit 304, the RF unit 302 and the antenna 301 (402).

When, as the result of the measurement by the control Ch demodulation unit 205 (502), the base station of the greatest forward reception power has changed from the BTS1 to the BTS2, the radio access terminal (AT) alters the designation of the communication-destination base station to the BTS2 (503). In this case, there has been the alteration of the communication-destination base station from the base station having communicated last (503). Therefore, the control Ch modulation unit 204 alters the ID of the designated communication-destination base station to the BTS2 and bestows the ID as part of a modulation encryption key, on the R-CQICH transmitted cyclically, and it transmits the R-CQICH, thereby to notify the communication destination to the base station (to make a hand-off request) (403, 404, and 507). The transmission power of the R-CQICH (transmission power of the CQICH) on this occasion is increased a fixed quantity as in Formula 4 by the control Ch modulation unit 204 (412, and 508), and it is transmitted through the RF unit 202 and the antenna 201 (509).

Transmission power of *CQICH*=Transmission power of Pilot *CH*+*CQICH* Gain Base+*CQICH* Gain Boost (Formula 4)

where CQICH Gain Boost: gain boost of the CQICH.

The base station (BTS1) receives the R-CQICH (403) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an FLAB and data. The R-CQICH (404) is also receivable at the base station (BTS2), but when the transmission power is insufficient, the signal sometimes fails to arrive at this base station, or this base station sometimes fails in the demodulation. In that case, the base station (BTS2) cannot accept the R-CQICH, and hence, it does not transmit the FLAB and the data.

Next, the radio access terminal (AT) does not receive the response of the FLAB from the communication-destination base station designated for the transmitted R-CQICH (510), and it therefore resends the R-CQICH (405, 406, and 507-509). The transmission power of the R-CQICH on this occasion is continually increased the fixed quantity as in Formula 4 (413, and 508).

The base station (BTS1) receives the R-CQICH (405) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit an FLAB and data. The base station (BTS2) receives the R-CQICH (406) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the FLAB from the scheduler 309 and through the control Ch modulation unit 304, the RF unit 302 and the antenna 301, after the execution and completion of a hand-off process (407).

When the radio access terminal (AT) receives (510) the FLAB (407) from the designated communication-destination base station (BTS2), the control Ch modulation unit 204 judges that the transmission of the R-CQICH containing the hand-off request has been successful. At the next R-CQICH transmission cycle (502, and 503), the control Ch modulation unit 204 returns the transmission power of the R-CQICH (504) in which the communication-destination base station is designated as the BTS2, as given by Formula 3 (414, and 505), and it transmits the R-CQICH through the RF unit 202 and the antenna 201 (408, and 506).

(Reverse Link)

Figure 7:
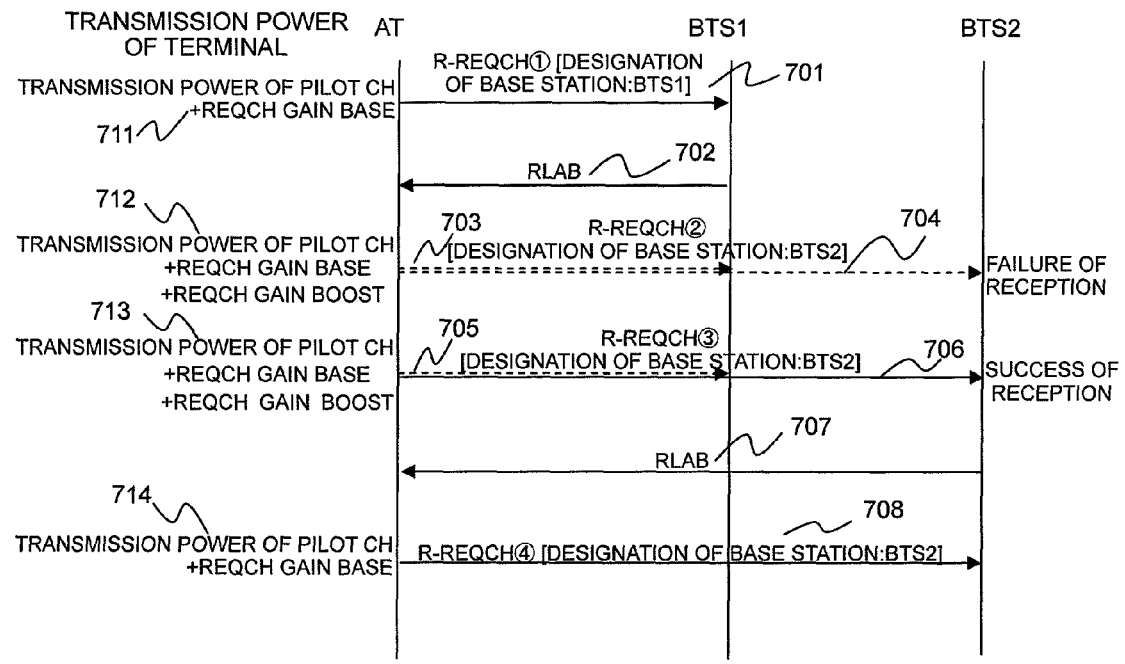
FIG. 7 is a diagram for explaining the power control algorithm of an R-REQCH in the first embodiment of the invention.

FIG. 7 is a diagram for explaining the power control algorithm of an R-REQCH in the first embodiment of the invention.

Figure 8:
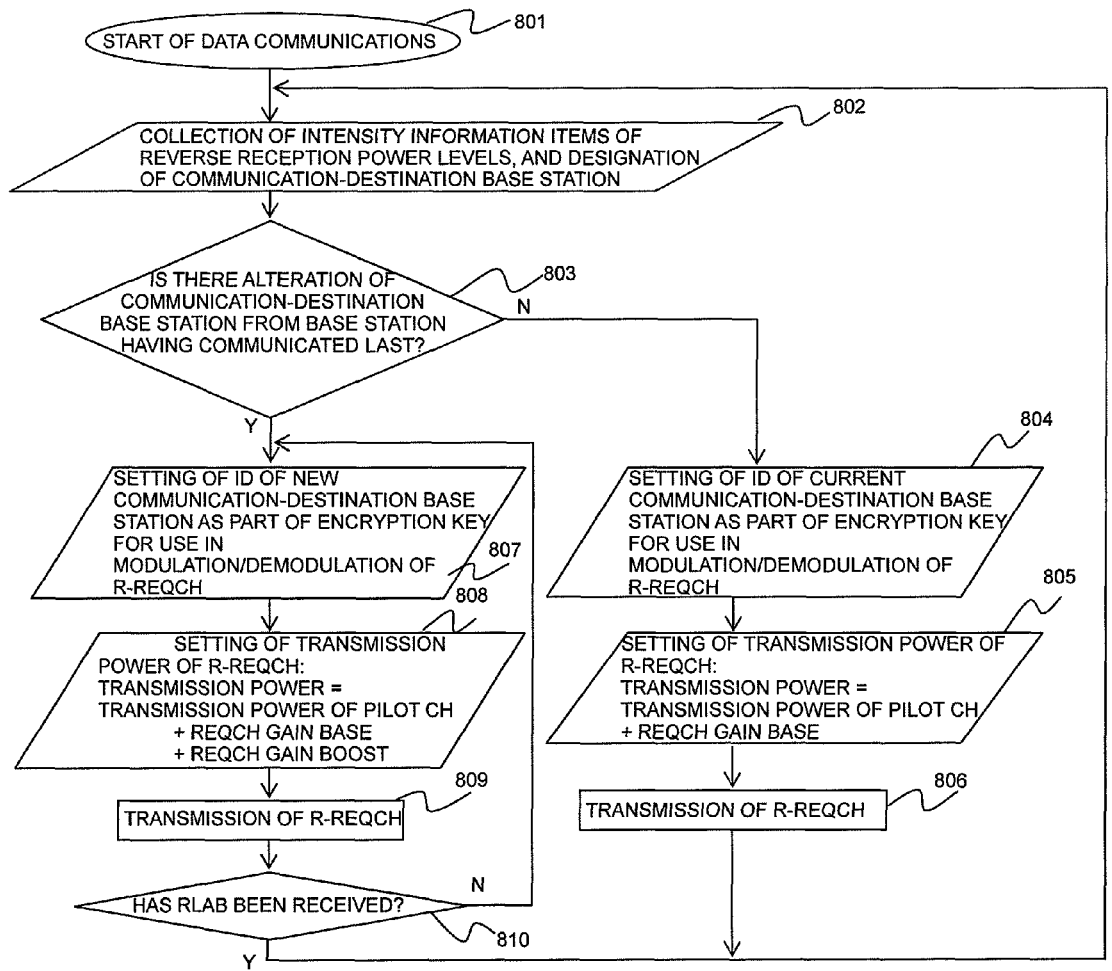
FIG. 8 is a flow chart of the operation of the AT as corresponds to the power control algorithm of the R-REQCH in the first embodiment of the invention.

FIG. 8 is a flow chart of the operation of an AT corresponding to the power control algorithm of the R-REQCH in the first embodiment of the invention.

Figure 9:
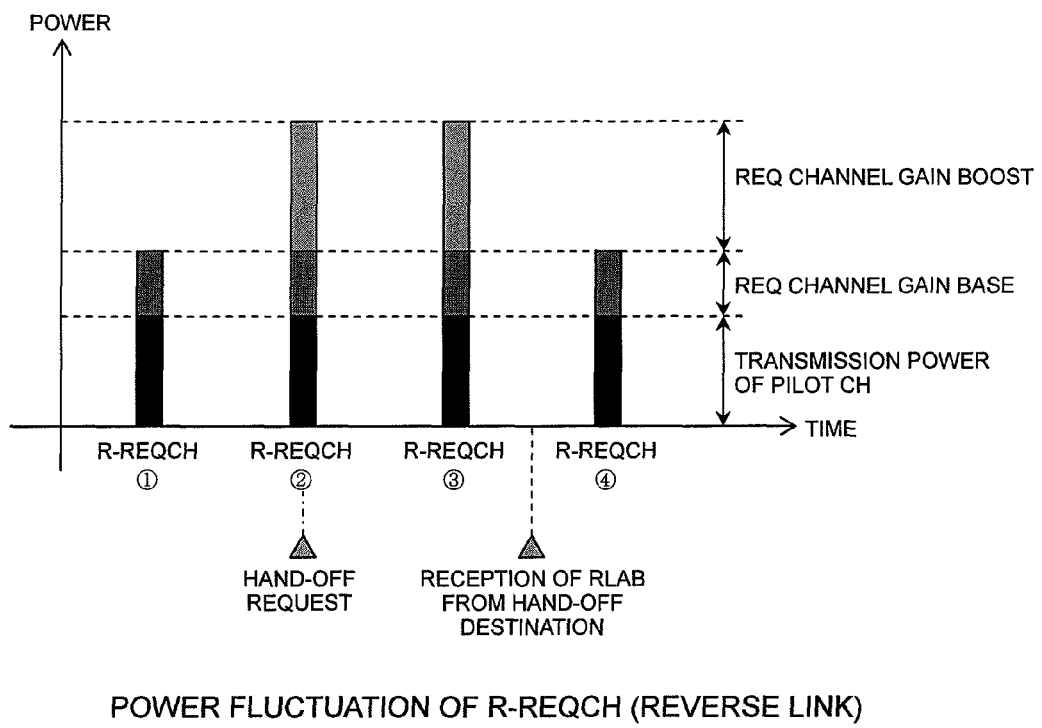
FIG. 9 is a diagram for explaining power changes which correspond to the power control algorithm of the R-REQCH in the first embodiment of the invention.

FIG. 9 is a diagram for explaining power changes corresponding to the power control algorithm of the R-REQCH in the first embodiment of the invention.

Now, the power control algorithm of the R-REQCH will be explained in conjunction with FIGS. 7, 8 and 9.

In a reverse link control, the radio access terminal (AT) accepts the intensity information items of reverse reception power levels from a plurality of base stations by the control Ch demodulation unit 205 through the antenna 201 and the RF unit 202, whereby data communications are started (801), and the base station (BTS1) of the greatest reception power is designated as the communication-destination base station (BTS1) of the reverse link (802). In this case, there is not any alteration of a communication-destination base station from a base station having communicated last (803). Therefore, the control Ch modulation unit 204 bestows the ID of the designated communication-destination base station as part of a modulation encryption key, on the R-REQCH transmitted cyclically, and then transmits the R-REQCH, thereby to notify the communication destination to the base station (701, and 804). The transmission power of the R-REQCH (transmission power of the REQCH) on this occasion is set as in Formula 5 by the control Ch modulation unit 204 (711, and 805), and it is transmitted through the RF unit 202 and the antenna 201 (806).

Transmission power of *REQCH*=Transmission power of Pilot *CH*+*REQCH* Gain Base (Formula 5)

The base station (BTS1) receives the R-REQCH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an RLAB (Reverse Link Assignment Block) from the scheduler 309 and through the control Ch modulation unit 304, the RF unit 302 and the antenna 301 (702).

When, as the result of the reverse information accepted by the control Ch demodulation unit 205 (802), the base station of the greatest reverse reception power has changed from the BTS1 to the BTS2, the radio access terminal (AT) alters the designation of the communication-destination base station to the BTS2 (803). In this case, there has been the alteration of the communication-destination base station from the base station having communicated last (803). Therefore, the control Ch modulation unit 204 alters the ID of the designated communication-destination base station to the BTS2 and bestows the ID as part of a modulation encryption key, on the R-REQCH transmitted cyclically, and it transmits the R-REQCH, thereby to notify the communication destination to the base station (to make a hand-off request) (703, 704, and 807). The transmission power of the R-REQCH (transmission power of the REQCH) on this occasion is increased a fixed quantity as in Formula 6 by the control Ch modulation unit 204 (712, and 808), and it is transmitted through the RF unit 202 and the antenna 201 (809).

$$\text{Transmission power of } REQCH = \text{Transmission power of Pilot } CH + REQCH \text{ Gain Base} + REQCH \text{ Gain Boost} \quad \text{(Formula 6)}$$

where REQCH Gain Boost: gain boost of the REQCH.

The base station (BTS1) receives the R-REQCH (703) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an RLAB and data. The R-REQCH (704) is also receivable at the base station (BTS2), but when the transmission power is insufficient, the signal sometimes fails to arrive at this base station, or this base station sometimes fails in the demodulation. In that case, the base station (BTS2) cannot accept the R-REQCH, and hence, it does not transmit the RLAB and the data.

Next, the radio access terminal (AT) does not receive the response of the RLAB from the communication-destination base station designated for the transmitted R-REQCH (810), and it therefore resends the R-REQCH (705, 706, 807 and 809). The transmission power of the R-REQCH on this occasion is continually increased the fixed quantity as in Formula 6 (713, and 808).

The base station (BTS1) receives the R-REQCH (705) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit an RLAB and data. The base station (BTS2) receives the R-REQCH (706) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the RLAB from the scheduler 309 and through the control Ch modulation unit 304, the RF unit 302 and the antenna 301, after the execution and completion of a hand-off process (707).

When the radio access terminal (AT) receives (810) the RLAB (707) from the designated communication-destination base station (BTS2), the control Ch modulation unit 204 judges that the transmission of the R-REQCH containing the hand-off request has been successful. At the next R-REQCH transmission cycle (802, and 803), the control Ch modulation unit 204 returns the transmission power of the R-REQCH (804) in which the communication-destination base station is designated as the BTS2, as given by Formula 5 (714, and 805), and it transmits the R-REQCH through the RF unit 202 and the antenna 201 (708, and 806).

By the way, in a case where the communication-destination base station designated by the forward link and the communication-destination base station designated by the reverse link are different, the radio access terminal and the base station hand off to the predetermined communication-destination base station designated by either of the forward and reverse links.

(2) Second Embodiment

It is assumed that the configuration of the whole network including a radio communication system, the configuration of a radio access terminal (AT) and the configuration of a base station are the same as in the first embodiment.

(Forward Link)

Figure 10:
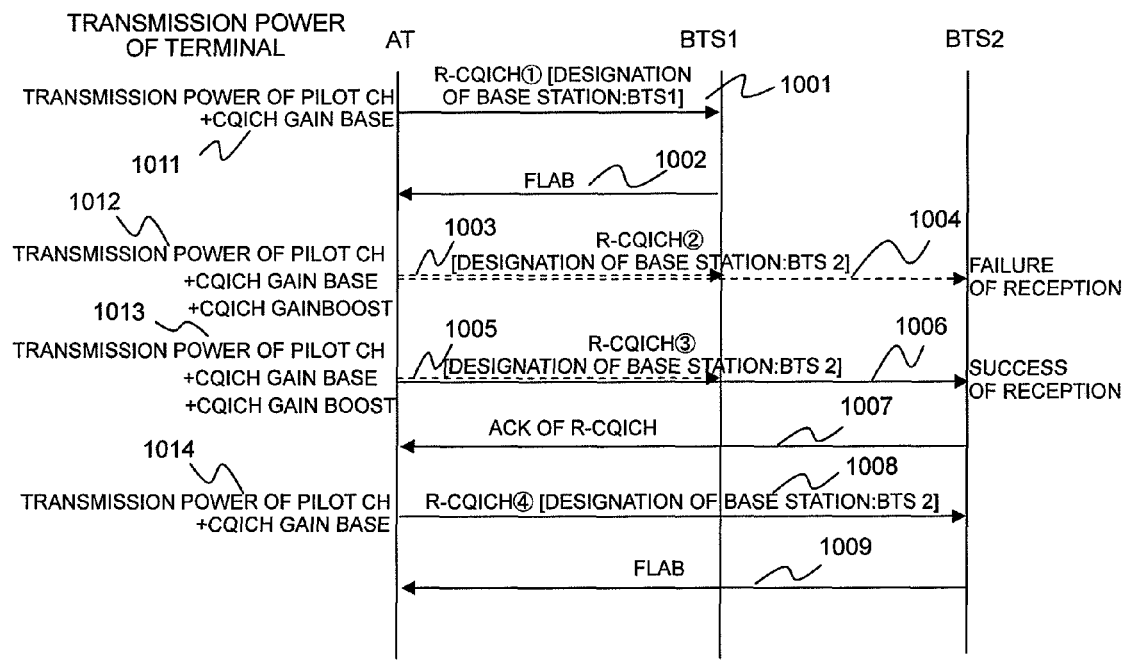
FIG. 10 is a diagram for explaining the power control algorithm of an R-CQICH in the second embodiment of the invention.

FIG. 10 is a diagram for explaining the power control algorithm of an R-CQICH in the second embodiment of the invention.

Figure 11:
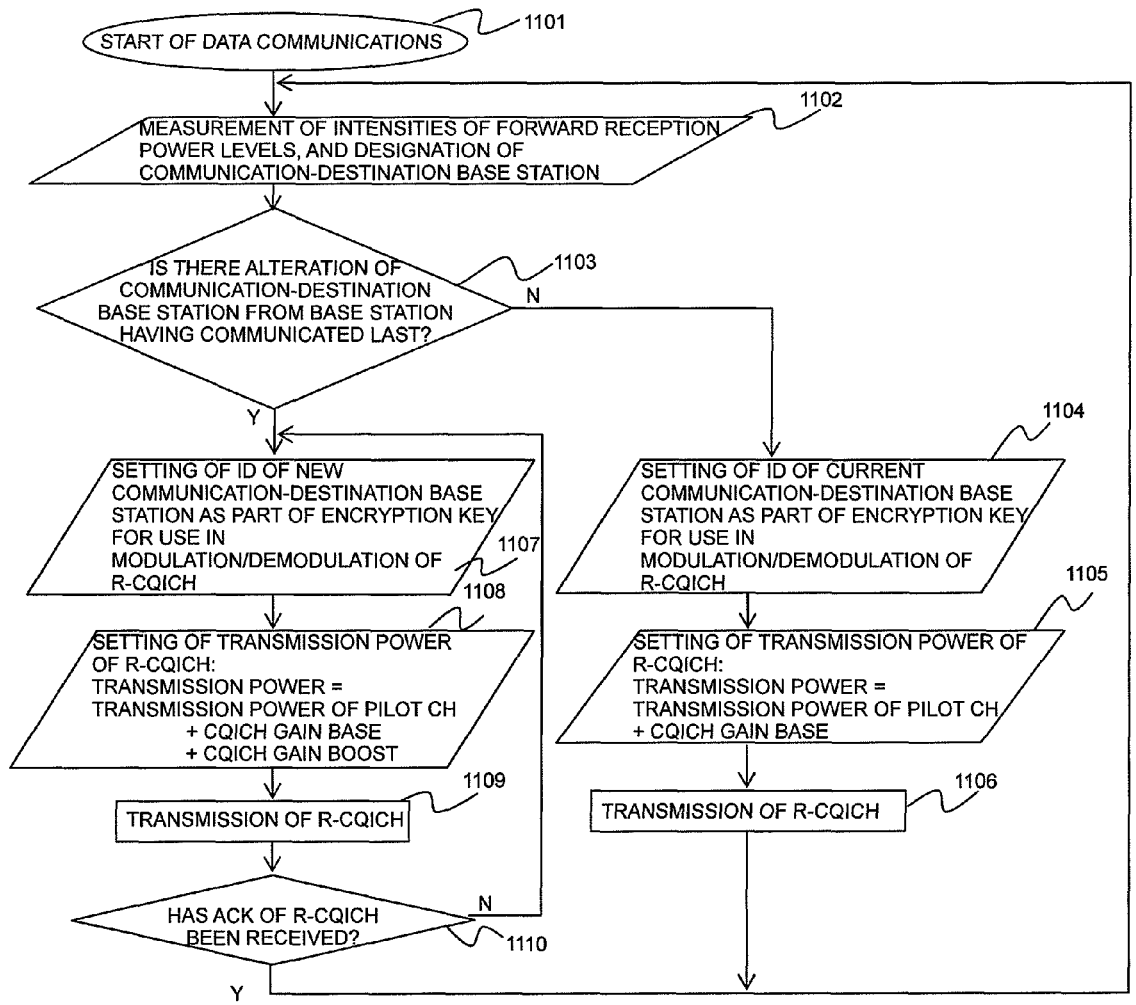
FIG. 11 is a flow chart of the operation of the AT as corresponds to the power control algorithm of the R-CQICH in the second embodiment of the invention.

FIG. 11 is a flow chart of the operation of an AT corresponding to the power control algorithm of the R-CQICH in the second embodiment of the invention.

Figure 12:
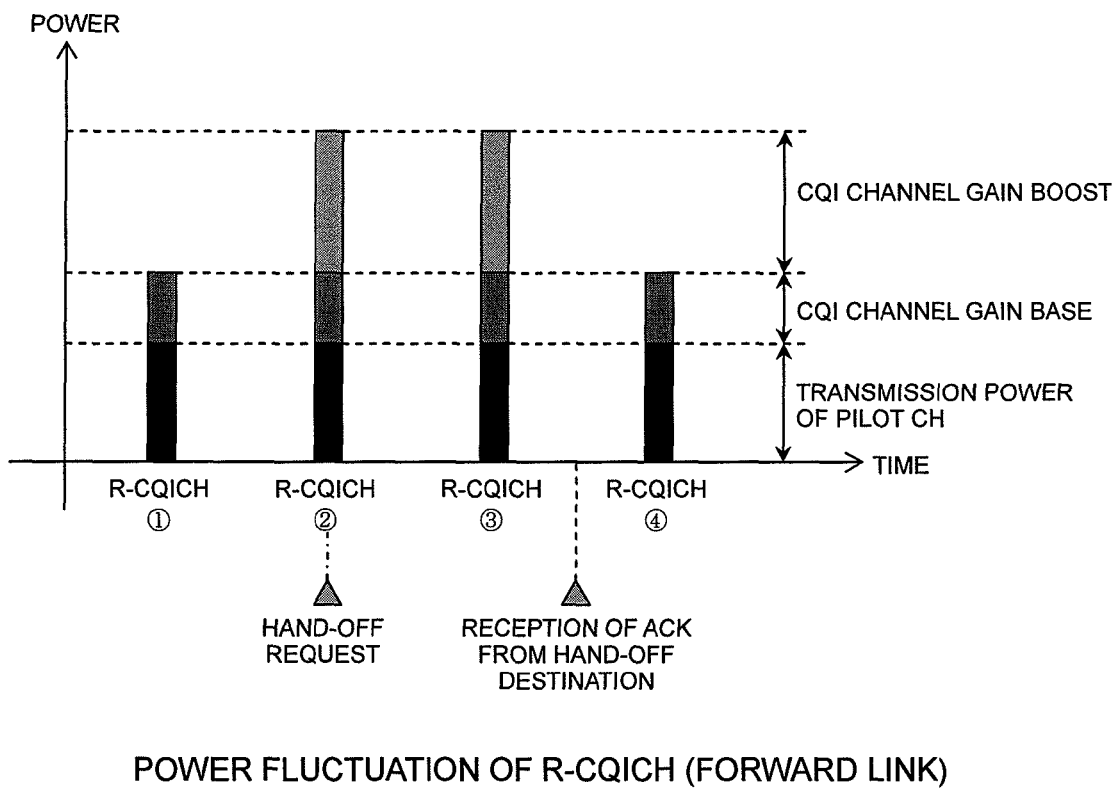
FIG. 12 is a diagram for explaining power changes which correspond to the power control algorithm of the R-CQICH in the second embodiment of the invention.

FIG. 12 is a diagram for explaining power changes corresponding to the power control algorithm of the R-CQICH in the second embodiment of the invention.

Now, the power control algorithm of the R-CQICH will be explained in conjunction with FIGS. 10, 11 and 12.

In the forward link, the radio access terminal (AT) receives control channels from a plurality of base stations, through the antenna 201 and the RF unit 202, whereby data communications are started (1101). The control Ch demodulation unit 205 measures reception power levels, and it designates the base station (BTS1) of the greatest reception power as the communication-destination base station (BTS1) of the forward link (1102). In this case, there is not any alteration of a communication-destination base station from a base station having communicated last (1103). Therefore, the control Ch modulation unit 204 bestows the ID of the designated communication-destination base station as part of a modulation encryption key, on the R-CQICH transmitted cyclically, and then transmits the R-CQICH, thereby to notify the communication destination to the base station (1001, and 1104). The transmission power of the R-CQICH (transmission power of the CQICH) on this occasion is set as in Formula 7 by the control Ch modulation unit 204 (1011, and 1105), and it is transmitted through the RF unit 202 and the antenna 201 (1106).

$$\text{Transmission power of } CQICH = \text{Transmission power of Pilot } CH + CQICH \text{ Gain Base} \quad \text{(Formula 7)}$$

The base station (BTS1) receives the R-CQICH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an FLAB from the scheduler 309 and through the control Ch modulation unit 304, the RF unit 302 and the antenna 301 (1002).

When, as the result of the measurement by the control Ch demodulation unit 205 (1102), the base station of the greatest forward reception power has changed from the BTS1 to the BTS2, the radio access terminal (AT) alters the designation of the communication-destination base station to the BTS2 (1103). In this case, there has been the alteration of the communication-destination base station from the base station having communicated last (1103). Therefore, the control Ch modulation unit 204 alters the ID of the designated communication-destination base station to the BTS2 and bestows the ID as part of a modulation encryption key, on the R-CQICH transmitted cyclically, and it transmits the R-CQICH, thereby to notify the communication destination to the base station (to make a hand-off request) (1003, 1004, and 1107). The transmission power of the R-CQICH (transmission power of the CQICH) on this occasion is increased a fixed quantity as in Formula 8 by the control Ch modulation unit 204 (1012, and 1108), and it is transmitted through the RF unit 202 and the antenna 201 (1109).

$$\text{Transmission power of } CQICH = \text{Transmission power of Pilot } CH + CQICH \text{ Gain Base} + CQICH \text{ Gain Boost} \quad \text{(Formula 8)}$$

The base station (BTS1) receives the R-CQICH (1003) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an FLAB and data. The R-CQICH (1004) is also receivable at the base station (BTS2), but when the transmission power is insufficient, the signal sometimes fails to arrive at this base station, or this base station sometimes fails in the demodulation. In that case, the base station (BTS2) cannot accept the R-CQICH, and hence, it does not transmit the ACK (acknowledgement) of the R-CQICK and the data.

Next, the radio access terminal (AT) does not receive the response of the ACK of the R-CQICH from the communication-destination base station designated for the transmitted R-CQICH (1110), and it therefore resends the R-CQICH (1005, 1006, and 1107-1109). The transmission power of the R-CQICH on this occasion is continually increased the fixed quantity as in Formula 8 (1013, and 1108).

The base station (BTS1) receives the R-CQICH (1005) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit the ACK of the R-CQICH or an FLAB, and data. The base station (BTS2) receives the R-CQICH (1006) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK (1008) of the R-CQICH. Further, it transmits an FLAB from the scheduler 309 and through the control Ch modulation unit 304, the RF unit 302 and the antenna 301, after the execution and completion of a hand-off process (1009).

When the radio access terminal (AT) receives (1110) the ACK (1008) of the R-CQICH from the designated communication-destination base station (BTS2), the radio access terminal (AT) judges that the transmission of the R-CQICH has been successful. At the next R-CQICH transmission cycle (1102, and 1103), the control radio access terminal (AT) returns the transmission power of the R-CQICH (1104) in which the communication-destination base station is designated as the BTS2, as given by Formula 7 (1014, and 1105), and it transmits the R-CQICH through the RF unit 202 and the antenna 201 (1009, and 1106).

(Reverse Link)

Figure 13:
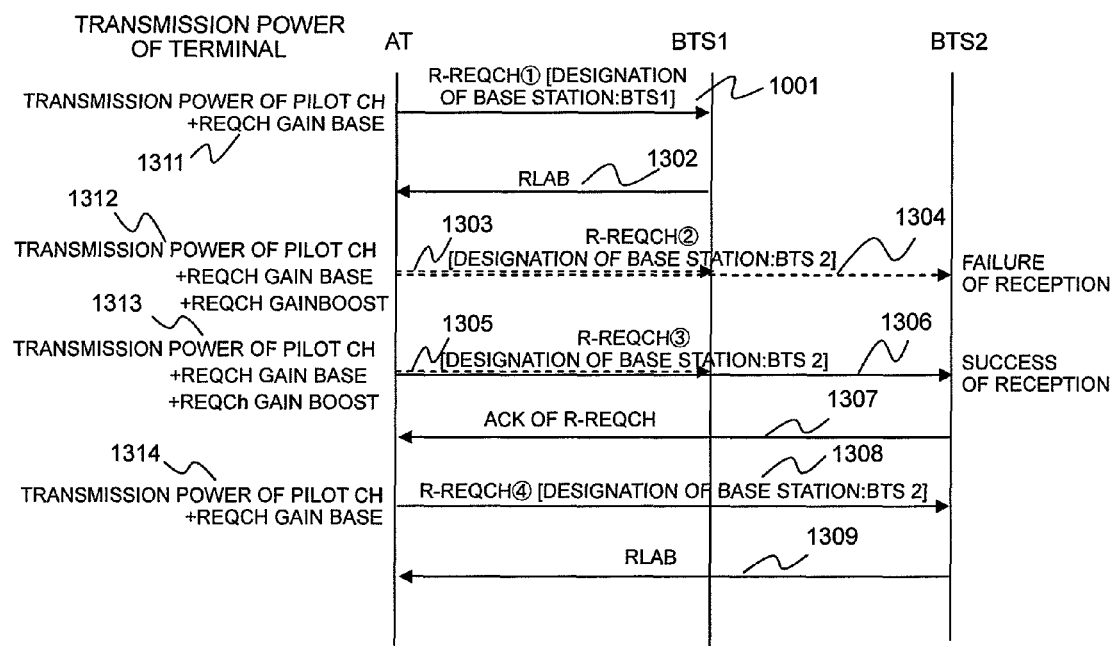
FIG. 13 is a diagram for explaining the power control algorithm of an R-REQCH in the second embodiment of the invention.

FIG. 13 is a diagram for explaining the power control algorithm of an R-REQCH in the second embodiment of the invention.

Figure 14:
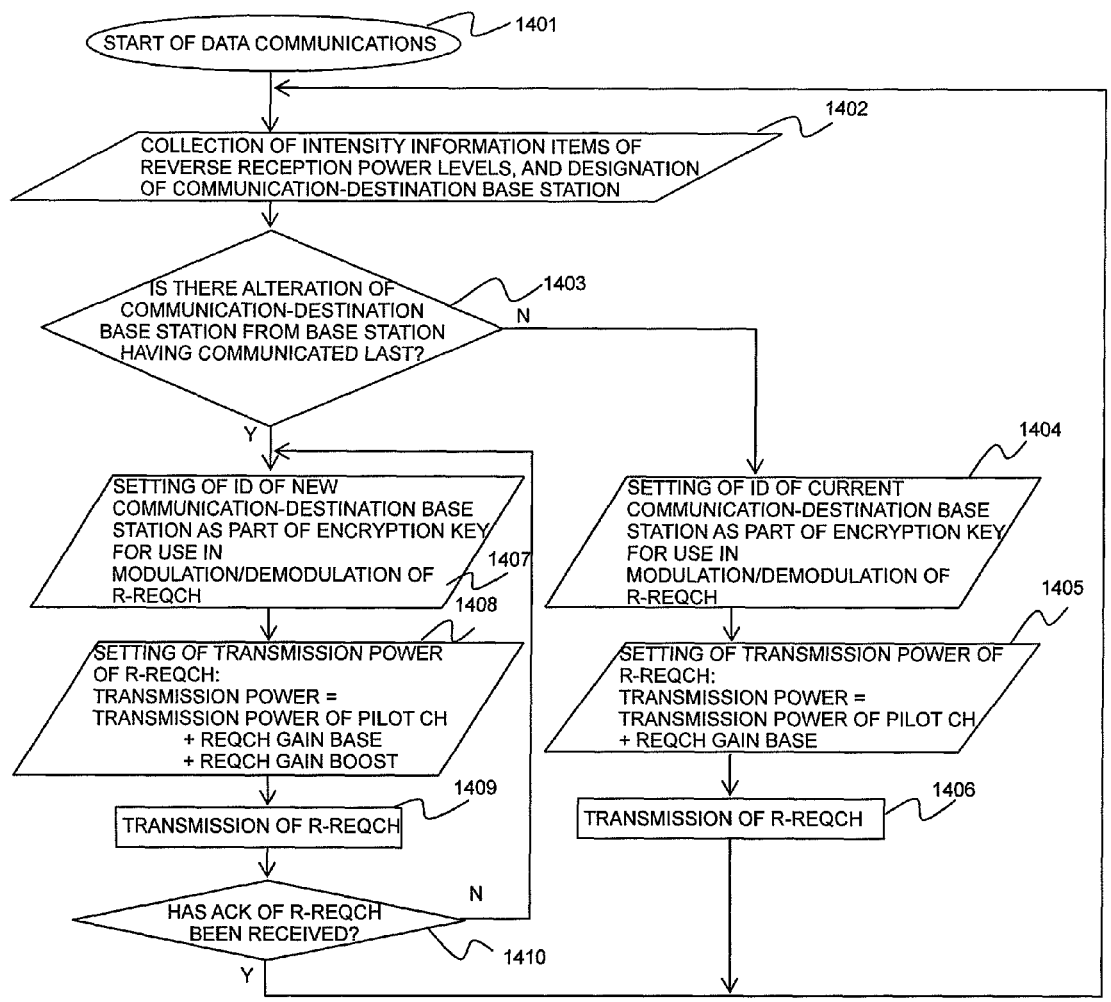
FIG. 14 is a flow chart of the operation of the AT as corresponds to the power control algorithm of the R-REQCH in the second embodiment of the invention.

FIG. 14 is a flow chart of the operation of an AT corresponding to the power control algorithm of the R-REQCH in the second embodiment of the invention.

Figure 15:
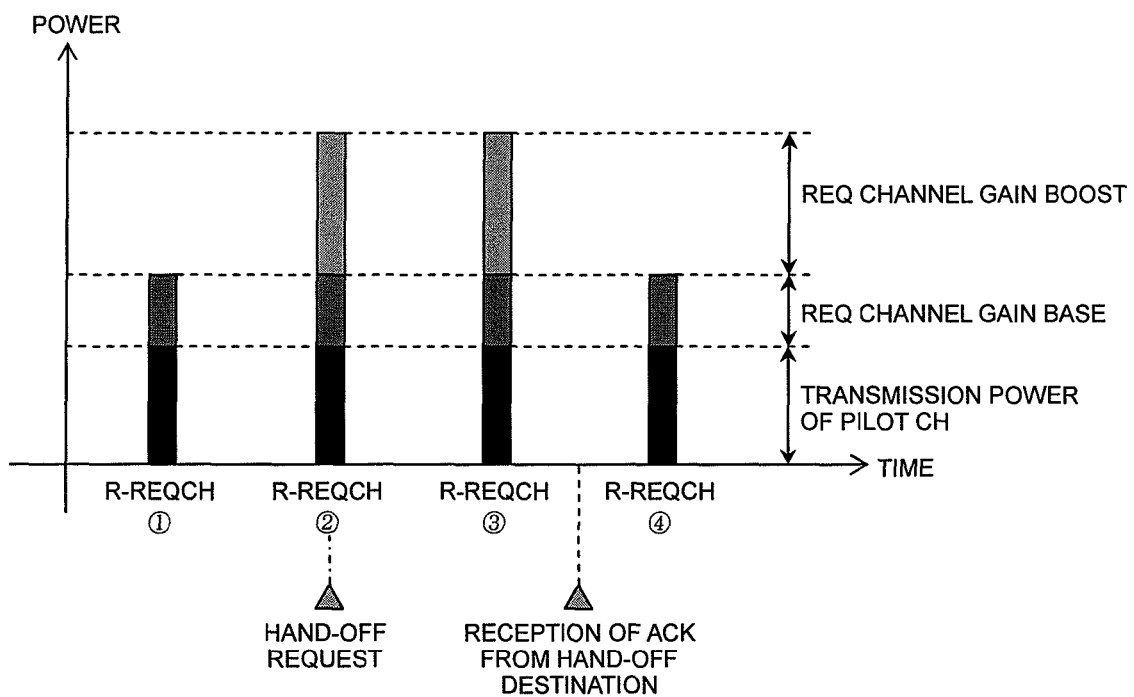
FIG. 15 is a diagram for explaining power changes which correspond to the power control algorithm of the R-REQCH in the second embodiment of the invention.

FIG. 15 is a diagram for explaining power changes corresponding to the power control algorithm of the R-REQCH in the second embodiment of the invention.

Now, the power control algorithm of the R-REQCH will be explained in conjunction with FIGS. 13, 14 and 15.

In a reverse link control, the radio access terminal (AT) accepts the intensity information items of reverse reception power levels from a plurality of base stations by the control Ch demodulation unit 205 through the antenna 201 and the RF unit 202, whereby data communications are started (1401), and the base station (BTS1) of the greatest reception power is designated as the communication-destination base station (BTS1) of the reverse link (1402). In this case, there is not any alteration of a communication-destination base station from a base station having communicated last (1103). Therefore, the control Ch modulation unit 204 bestows the ID of the designated communication-destination base station as part of a modulation encryption key, on the R-REQCH transmitted cyclically, and then transmits the R-REQCH, thereby to notify the communication destination to the base station (1301, and 1404). The transmission power of the R-REQCH (transmission power of the REQCH) on this occasion is set as in Formula 9 by the control Ch modulation unit 204 (1311, and 1405), and it is transmitted through the RF unit 202 and the antenna 201 (1406).

$$\text{Transmission power of } REQCH = \text{Transmission power of Pilot } CH + REQCH \text{ Gain Base} \quad \text{(Formula 9)}$$

The base station (BTS1) receives the R-REQCH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an RLAB from the scheduler 309 and through the control Ch modulation unit 304, the RF unit 302 and the antenna 301 (1302).

When, as the result of the information accepted by the control Ch demodulation unit 205 (1402), the base station of the greatest reverse reception power has changed from the BTS1 to the BTS2, the radio access terminal (AT) alters the designation of the communication-destination base station to the BTS2 (1403). In this case, there has been the alteration of the communication-destination base station from the base station having communicated last (1103). Therefore, the control Ch modulation unit 204 alters the ID of the designated communication-destination base station to the BTS2 and bestows the ID as part of a modulation encryption key, on the R-REQCH transmitted cyclically, and it transmits the R-REQCH, thereby to notify the communication destination to the base station (to make a hand-off request) (1303, 1304, and 1407). The transmission power of the R-REQCH (transmission power of the REQCH) on this occasion is increased a fixed quantity as in Formula 10 by the control Ch modulation unit 204 (1312, and 1408), and it is transmitted through the RF unit 202 and the antenna 201 (1409).

$$\text{Transmission power of } REQCH = \text{Transmission power of Pilot } CH + REQCH \text{ Gain Base} + REQCH \text{ Gain Boost} \quad \text{(Formula 10)}$$

The base station (BTS1) receives the R-REQCH (1303) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an RLAB and data. The R-REQCH (1304) is also receivable at the base station (BTS2), but when the transmission power is insufficient, the signal sometimes fails to arrive at this base station, or this base station sometimes fails in the demodulation. In that case, the base station (BTS2) cannot accept the R-REQCH, and hence, it does not transmit the ACK of the R-REQCH and the data.

Next, the radio access terminal (AT) does not receive the response of the ACK of the R-REQCH from the communication-destination base station designated for the transmitted R-REQCH (1410), and it therefore resends the R-REQCH (1305, 1306, 1407 and 1409). The transmission power of the R-REQCH on this occasion is continually increased the fixed quantity as in Formula 10 (1313, and 1408).

The base station (BTS1) receives the R-REQCH (1305) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit the ACK of the R-REQCH or an RLAB, and data. The base station (BTS2) receives the R-REQCH (1306) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK of the R-REQCH (1307). Further, it transmits the RLAB from the scheduler 309 and through the control Ch modulation unit 304, the RF unit 302 and the antenna 301, after the execution and completion of a hand-off process (1309).

When the radio access terminal (AT) receives (1410) the ACK (1307) of the R-REQCH from the designated communication-destination base station (BTS2), the control Ch modulation unit 204 judges that the transmission of the R-REQCH containing the hand-off request has been successful. At the next R-REQCH transmission cycle (1402, and 1403), the control Ch modulation unit 204 returns the transmission power of the R-REQCH (1404) in which the communication-destination base station is designated as the BTS2, as given by Formula 9 (1314, and 1405), and it transmits the R-REQCH through the RF unit 202 and the antenna 201 (1309, and 1406).

(3) Third Embodiment

It is assumed that the configuration of the whole network including a radio communication system, the configuration of a radio access terminal (AT) and the configuration of a base station are the same as in the first embodiment.

(Forward Link)

Figure 16:
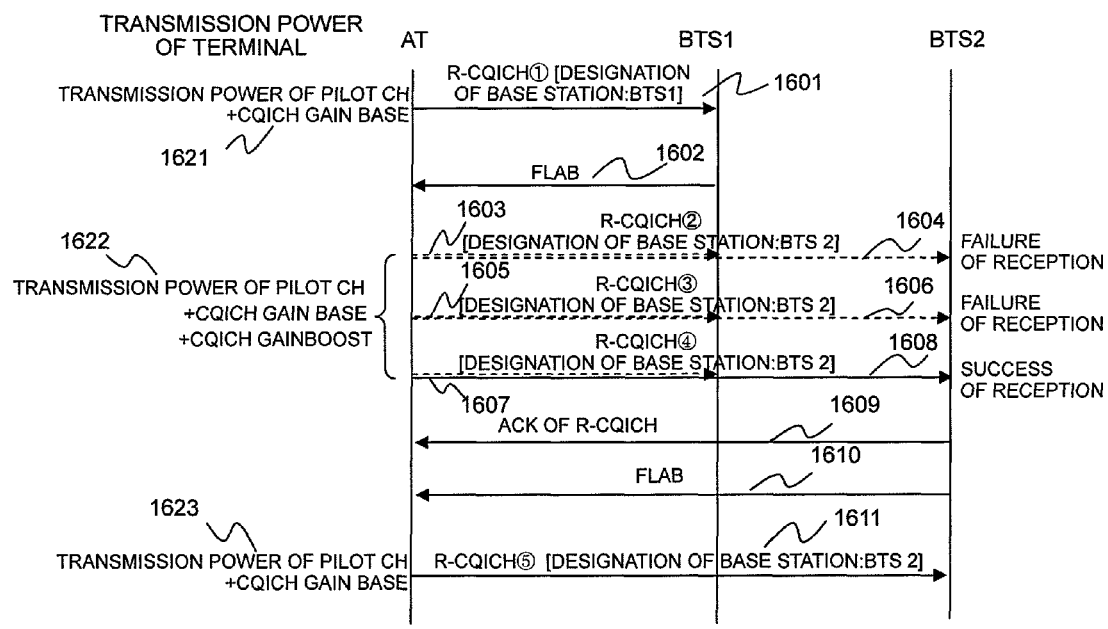
FIG. 16 is a diagram for explaining the power control algorithm of an R-CQICH in the third embodiment of the invention.

FIG. 16 is a diagram for explaining the power control algorithm of an R-CQICH in the third embodiment of the invention.

Figure 17:
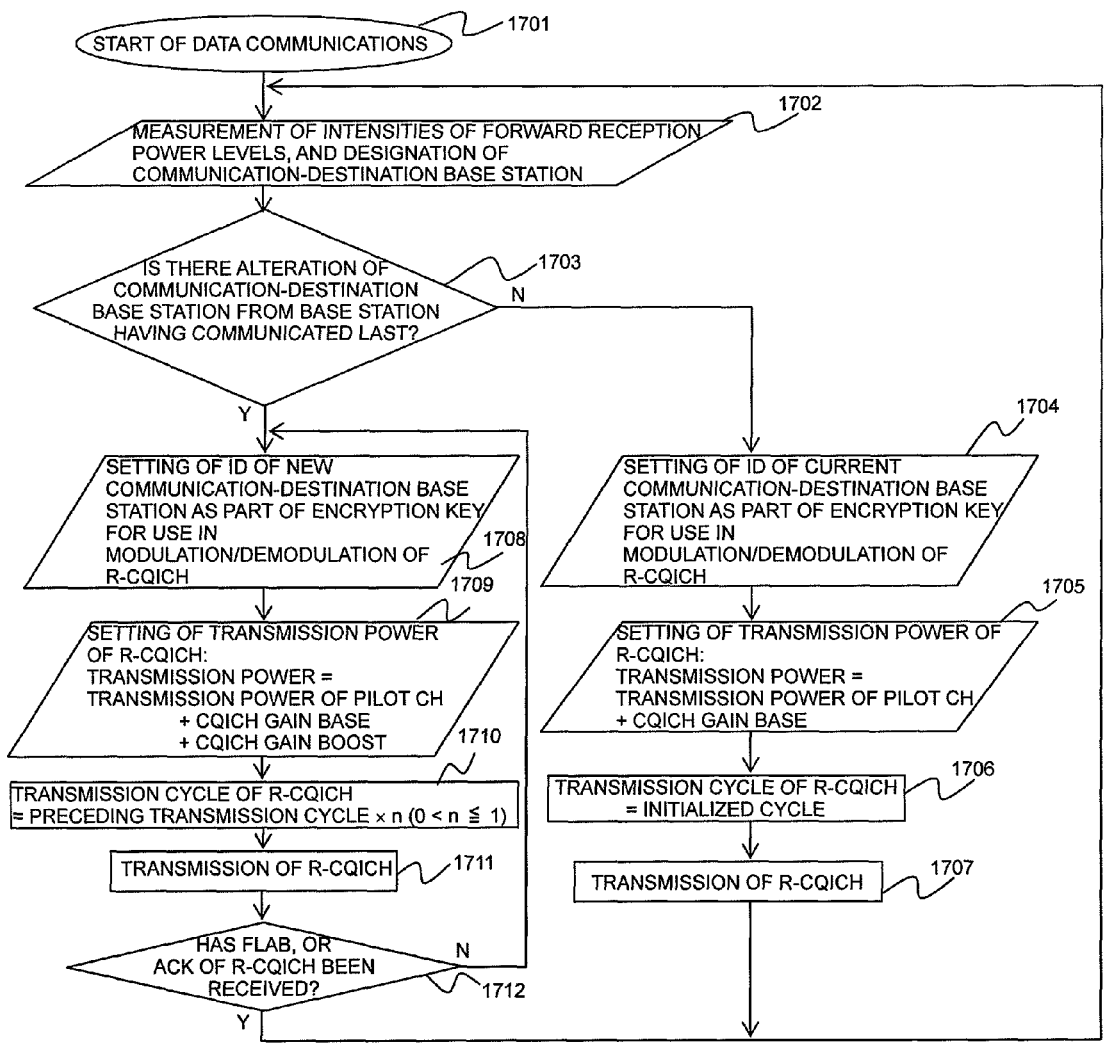
FIG. 17 is a flow chart of the operation of the AT as corresponds to the power control algorithm of the R-CQICH in the third embodiment of the invention.

FIG. 17 is a flow chart of the operation of an AT corresponding to the power control algorithm of the R-CQICH in the third embodiment of the invention.

Figure 18:
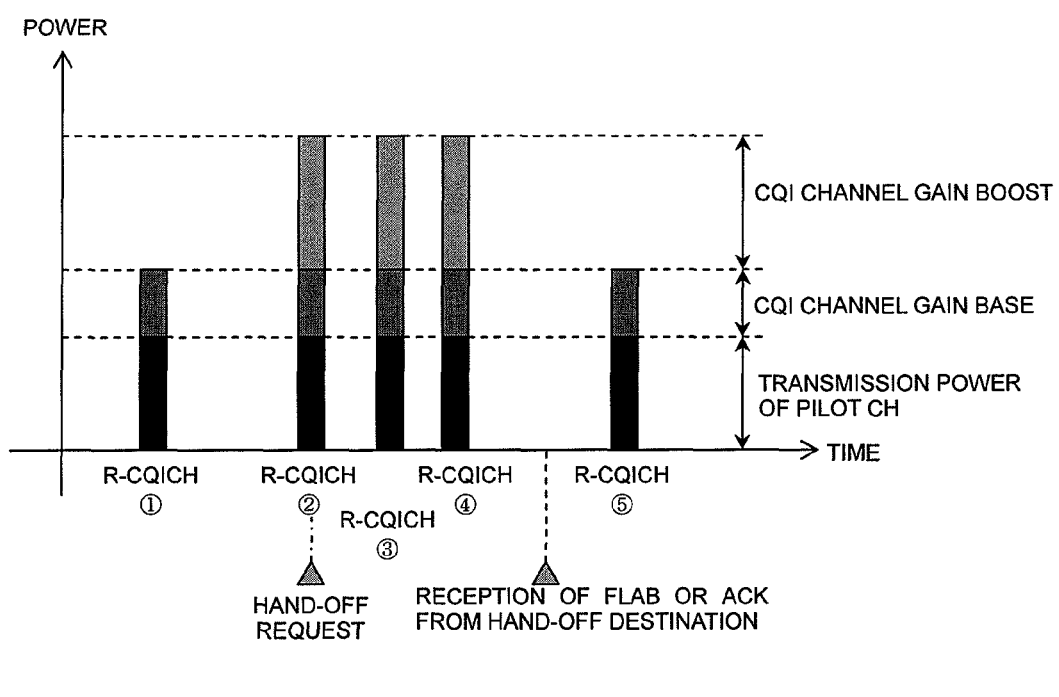
FIG. 18 is a diagram for explaining power changes which correspond to the power control algorithm of the R-CQICH in the third embodiment of the invention.

FIG. 18 is a diagram for explaining power changes corresponding to the power control algorithm of the R-CQICH in the third embodiment of the invention.

Now, the power control algorithm of the R-CQICH will be explained in conjunction with FIGS. 16, 17 and 18.

In the forward link, the radio access terminal (AT) receives control channels from a plurality of base stations, through the antenna 201 and the RF unit 202, whereby data communications are started (1701). The control Ch demodulation unit 205 measures reception power levels, and it designates the base station (BTS1) of the greatest reception power as the communication-destination base station (BTS1) of the forward link (1702). In this case, there is not any alteration of a communication-destination base station from a base station having communicated last (1703). Therefore, the control Ch modulation unit 204 bestows the ID of the designated communication-destination base station as part of a modulation encryption key, on the R-CQICH transmitted cyclically, and then transmits the R-CQICH, thereby to notify the communication destination to the base station (1601, and 1704). The transmission power of the R-CQICH (transmission power of the CQICH) on this occasion is set as in Formula 11 by the control Ch modulation unit 204 (1621, and 1705), and it is transmitted through the RF unit 202 and the antenna 201 (1707) in an initialized transmission cycle (1706).

Transmission power of $CQICH$=Transmission power of Pilot $CH$+$CQICH$ Gain Base     (Formula 11)

The base station (BTS1) receives the R-CQICH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an FLAB from the scheduler 309 and through the control Ch modulation unit 304, the RF unit 302 and the antenna 301 (1602).

When, as the result of the measurement by the control Ch demodulation unit 205 (1702), the base station of the greatest forward reception power has changed from the BTS1 to the BTS2, the radio access terminal (AT) alters the designation of the communication-destination base station to the BTS2 (1703). In this case, there has been the alteration of the communication-destination base station from the base station having communicated last (1703). Therefore, the control Ch modulation unit 204 alters the ID of the designated communication-destination base station to the BTS2 and bestows the ID as part of a modulation encryption key, on the R-CQICH transmitted cyclically, and it transmits the R-CQICH, thereby to notify the communication destination to the base station (to make a hand-off request) (1603, 1604, and 1708). The transmission power of the R-CQICH (transmission power of the CQICH) on this occasion is increased a fixed quantity as in Formula 12 by the control Ch modulation unit 204 (1622, and 1709).

Transmission power of $CQICH$=Transmission power of Pilot $CH$+$CQICH$ Gain Base+$CQICH$ Gain Boost     (Formula 12)

Besides, the control Ch modulation unit 204 sets the transmission cycle of the R-CQICH on this occasion, in a form shortened as indicated by Formula (13) (1710).

Transmission cycle of $CQICH$=Preceding transmission cycle×$n$ (where $n$ denotes a predetermined constant corresponding to $0<n\leq 1$)     (Formula 13)

Subsequently, the control Ch modulation unit 204 transmits the R-CQICH through the RF unit 202 and the antenna 201 (1711).

The base station (BTS1) receives the R-CQICH (1603) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an FLAB and data. The R-CQICH (1604) is also receivable at the base station (BTS2), but when the transmission power is insufficient, the signal sometimes fails to arrive at this base station, or this base station sometimes fails in the demodulation. In that case, the base station (BTS2) cannot accept the R-CQICH, and hence, it does not transmit the ACK of the R-CQICK or an FLAB, and data.

Next, the radio access terminal (AT) does not receive the response of the ACK of the R-CQICH or the FLAB from the communication-destination base station designated for the transmitted R-CQICH (1712). Therefore, it resends the R-CQICH until the response of the ACK of the R-CQICH or the FLAB comes (1605, 1606, 1607, 1608, and 1708-1711). The transmission power and transmission cycle of the R-CQICH on this occasion are continually increased the fixed quantity as in Formula 12 and shortened as in Formula 13, respectively (1622, 1709, and 1710).

The base station (BTS1) receives the R-CQICH (1605, and 1607) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit the FLAB and the data. The base station (BTS2) receives the R-CQICH (1606, and 1608) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK (1609) of the R-CQICH. Further, it transmits the FLAB from the scheduler 309 and through the control Ch modulation unit 304, the RF unit 302 and the antenna 301, after the execution and completion of a hand-off process (1610).

When the radio access terminal (AT) receives (1712) the ACK (1609) of the R-CQICH or the FLAB (1610) from the designated communication-destination base station (BTS2), the control Ch modulation unit 204 judges that the transmission of the R-CQICH has been successful. Then, the control Ch modulation unit 204 returns the transmission power of the R-CQICH (1704) in which the communication-destination base station is designated as the BTS2, as given by Formula 11 (1623, and 1705), and it returns the transmission cycle to the initial value thereof (1706), whereupon it transmits the R-CQICH (1611, and 1707).

(Reverse Link)

Figure 19:
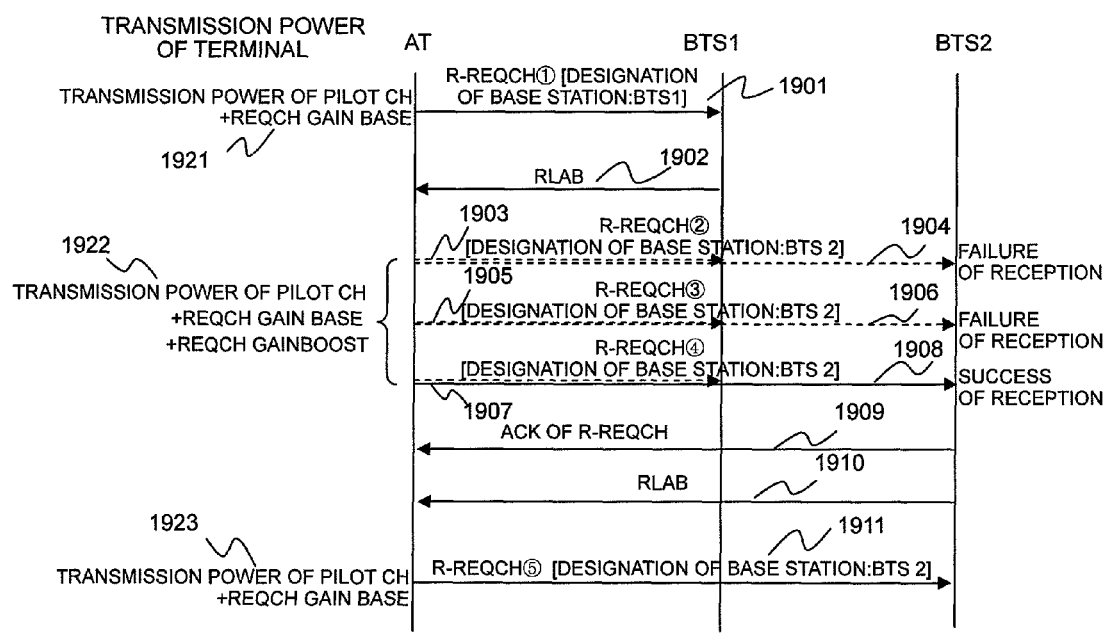
FIG. 19 is a diagram for explaining the power control algorithm of an R-REQCH in the third embodiment of the invention.

FIG. 19 is a diagram for explaining the power control algorithm of an R-REQCH in the third embodiment of the invention.

Figure 20:
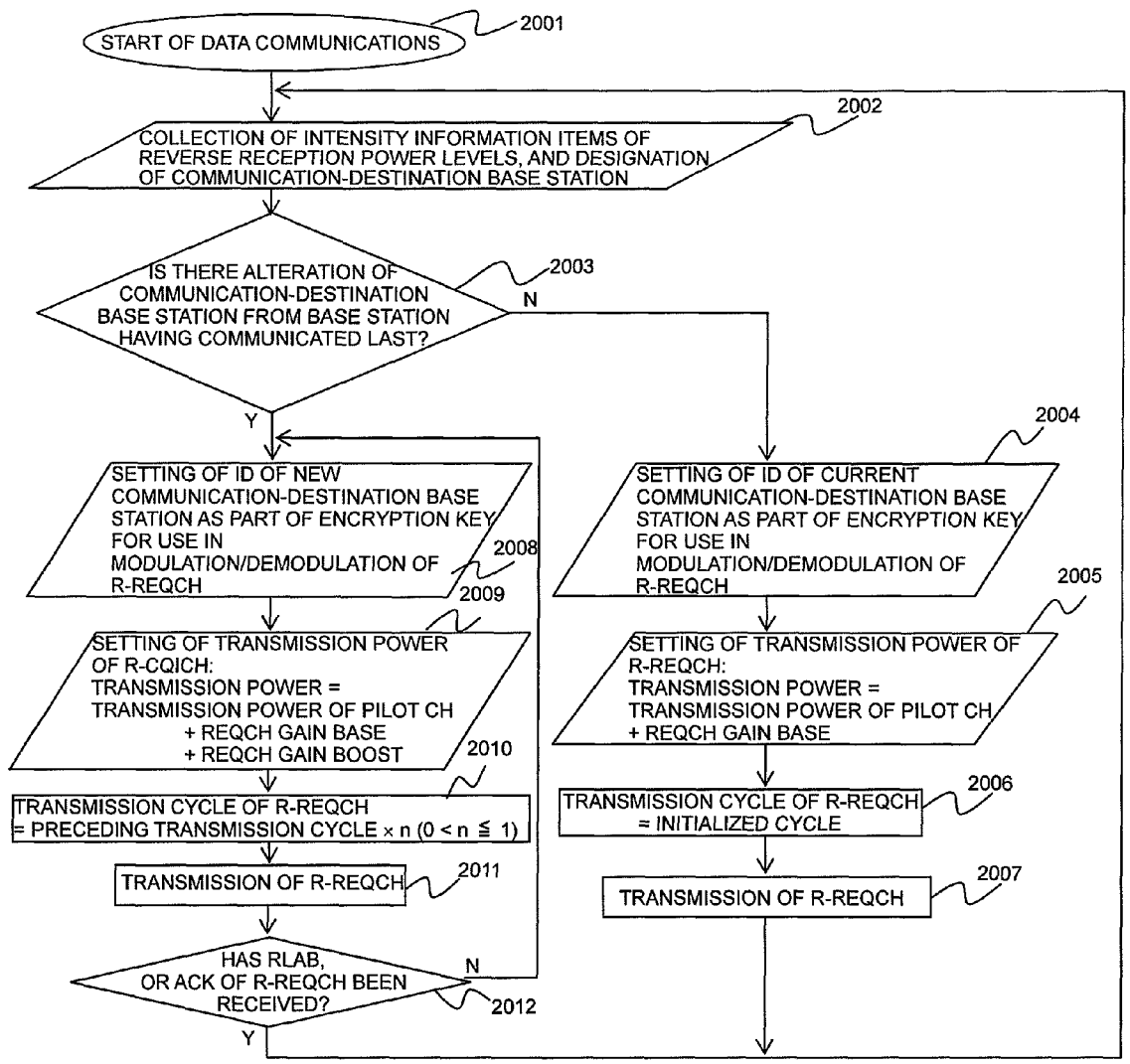
FIG. 20 is a flow chart of the operation of the AT as corresponds to the power control algorithm of the R-REQCH in the third embodiment of the invention.

FIG. 20 is a flow chart of the operation of an AT corresponding to the power control algorithm of the R-REQCH in the third embodiment of the invention.

Figure 21:
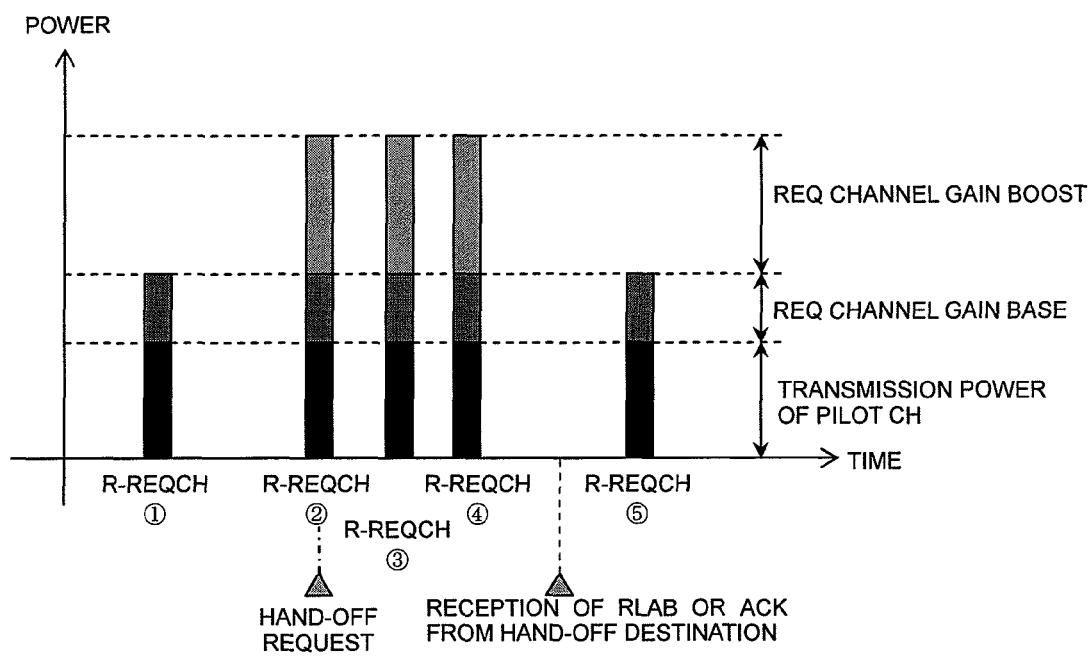
FIG. 21 is a diagram for explaining power changes which correspond to the power control algorithm of the R-REQCH in the third embodiment of the invention.

FIG. 21 is a diagram for explaining power changes corresponding to the power control algorithm of the R-REQCH in the third embodiment of the invention.

Now, the power control algorithm of the R-REQCH will be explained in conjunction with FIGS. 19, 20 and 21.

In a reverse link control, the radio access terminal (AT) accepts the intensity information items of reverse reception power levels from a plurality of base stations by the control Ch demodulation unit 205 through the antenna 201 and the RF unit 202, whereby data communications are started (2001), and the base station (BTS1) of the greatest reception power is designated as the communication-destination base station (BTS1) of the reverse link (2002). In this case, there is not any alteration of a communication-destination base station from a base station having communicated last (2003). Therefore, the control Ch modulation unit 204 bestows the ID of the designated communication-destination base station as part of a modulation encryption key, on the R-REQCH transmitted cyclically, and then transmits the R-REQCH, thereby to notify the communication destination to the base station (1901, and 2004). The transmission power of the R-REQCH (transmission power of the REQCH) on this occasion is set as in Formula 14 by the control Ch modulation unit 204 (1921, and 2005), and the transmission cycle thereof is set at an initialized transmission cycle (2006), whereupon the R-REQCH is transmitted through the RF unit 202 and the antenna 201 (2007).

Transmission power of $REQCH$=Transmission power of Pilot $CH$+$REQCH$ Gain Base (Formula 14)

The base station (BTS1) receives the R-REQCH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an RLAB from the scheduler 309 and through the control Ch modulation unit 304, the RF unit 302 and the antenna 301 (1902).

When, as the result of the information accepted by the control Ch demodulation unit 205 (2002), the base station of the greatest reverse reception power has changed from the BTS1 to the BTS2, the radio access terminal (AT) alters the designation of the communication-destination base station to the BTS2 (2003). In this case, there has been the alteration of the communication-destination base station from the base station having communicated last (2003). Therefore, the control Ch modulation unit 204 alters the ID of the designated communication-destination base station to the BTS2 and bestows the ID as part of a modulation encryption key, on the R-REQCH transmitted cyclically, and it transmits the R-REQCH, thereby to notify the communication destination to the base station (to make a hand-off request) (1903, 1904, and 2008). The transmission power of the R-REQCH (transmission power of the REQCH) on this occasion is increased a fixed quantity as in Formula 15 by the control Ch modulation unit 204 (1922, and 2009).

Transmission power of $REQCH$=Transmission power of Pilot $CH$+$REQCH$ Gain Base+$REQCH$ Gain Boost (Formula 15)

Besides, the control Ch modulation unit 204 transmits the transmission power through the RF unit 202 and the antenna 201 (2011).

Further, the control Ch modulation unit 204 sets the transmission cycle of the R-REQCH on this occasion, in a form shortened as indicated by Formula (16) (2010).

Transmission cycle of $REQCH$=Preceding transmission cycle×$n$ (where $n$ denotes a predetermined constant corresponding to $0<n\leq 1$) (Formula 16)

Subsequently, the control Ch modulation unit 204 transmits the REQCH through the RF unit 202 and the antenna 201 (2011).

The base station (BTS1) receives the R-REQCH (1903) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an RLAB and data. The R-REQCH (1904) is also receivable at the base station (BTS2), but when the transmission power is insufficient, the signal sometimes fails to arrive at this base station, or this base station sometimes fails in the demodulation. In that case, the base station (BTS2) cannot accept the R-REQCH, and hence, it does not transmit the ACK of the R-REQCH or the RLAB, and the data.

Next, the radio access terminal (AT) does not receive the response of the ACK of the R-REQCH or an RLAB from the communication-destination base station designated for the transmitted R-REQCH (2012), and it therefore resends the R-REQCH (1905, 1906, 1907, 1908, and 2008-2011) until the response of the ACK of the R-REQCH or the RLAB comes. The transmission power and transmission cycle of the R-REQCH on this occasion are continually increased the fixed quantity as in Formula 15 and shortened as in Formula 16, respectively (1922, 2009, and 2010).

The base station (BTS1) receives the R-REQCH (1905, and 1907) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit an RLAB and data. The basestation (BTS2) receives the R-REQCH (1908) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK of the R-REQCH (1909). Further, it transmits the RLAB from the scheduler 309 and through the control Ch modulation unit 304, the RF unit 302 and the antenna 301, after the execution and completion of a hand-off process (1910).

When the radio access terminal (AT) receives (2012) the ACK (1909) of the R-REQCH or the RLAB (1910) from the designated communication-destination base station (BTS2), the control Ch modulation unit 204 judges that the transmission of the R-REQCH containing the hand-off request has been successful. Then, the control Ch modulation unit 204 returns the transmission power of the R-REQCH in which the communication-destination base station is designated as the BTS2, as given by Formula 14 (1922, and 2005), and it returns the transmission cycle to the initial value thereof (2006), whereupon it transmits the R-REQCH through the antenna 201 and the RF unit 202 (1911, and 2007).

Incidentally, apart from this example, the transmission cycle of the current time may well be appropriately shortened a predetermined value with respect to the transmission cycle of the last time. Alternatively, the transmission cycle may well be shortened in accordance with the number of times of transmissions as indicated by the following formula by way of example:

Transmission cycle of *REQCH*=Initial value/Number of times of transmissions (4) Fourth Embodiment It is assumed that the configuration of the whole network including a radio communication system, the configuration of a radio access terminal (AT) and the configuration of a base station are the same as in the first embodiment.
(Forward Link)

Figure 22:
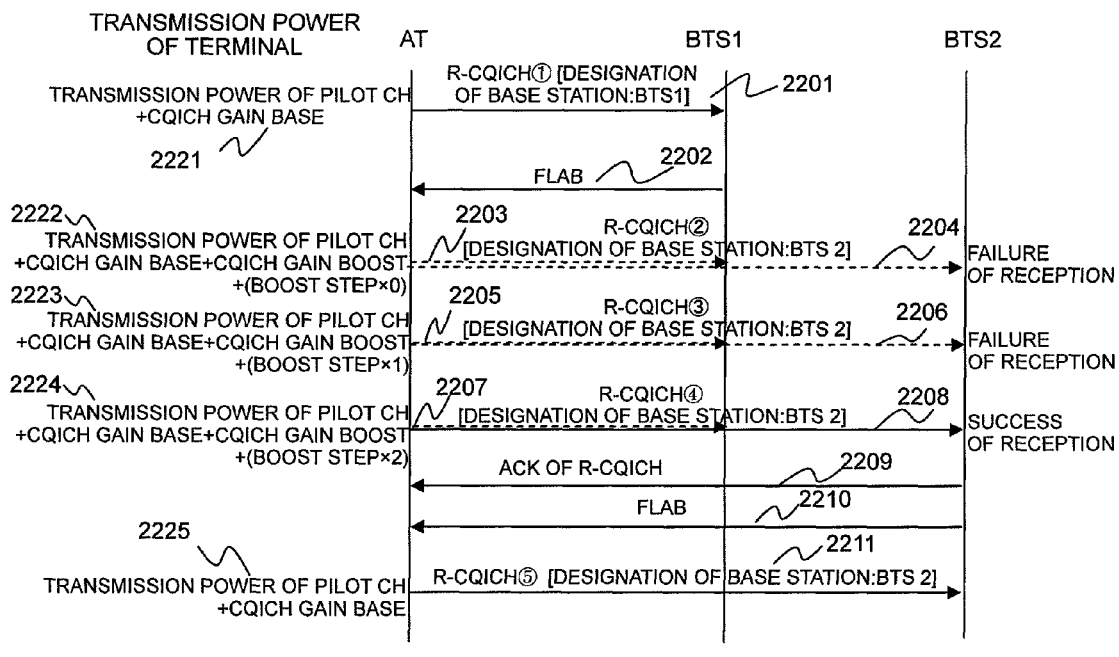
FIG. 22 is a diagram for explaining the power control algorithm of an R-CQICH in the fourth embodiment of the invention.

FIG. 22 is a diagram for explaining the power control algorithm of an R-CQICH in the fourth embodiment of the invention.

Figure 23:
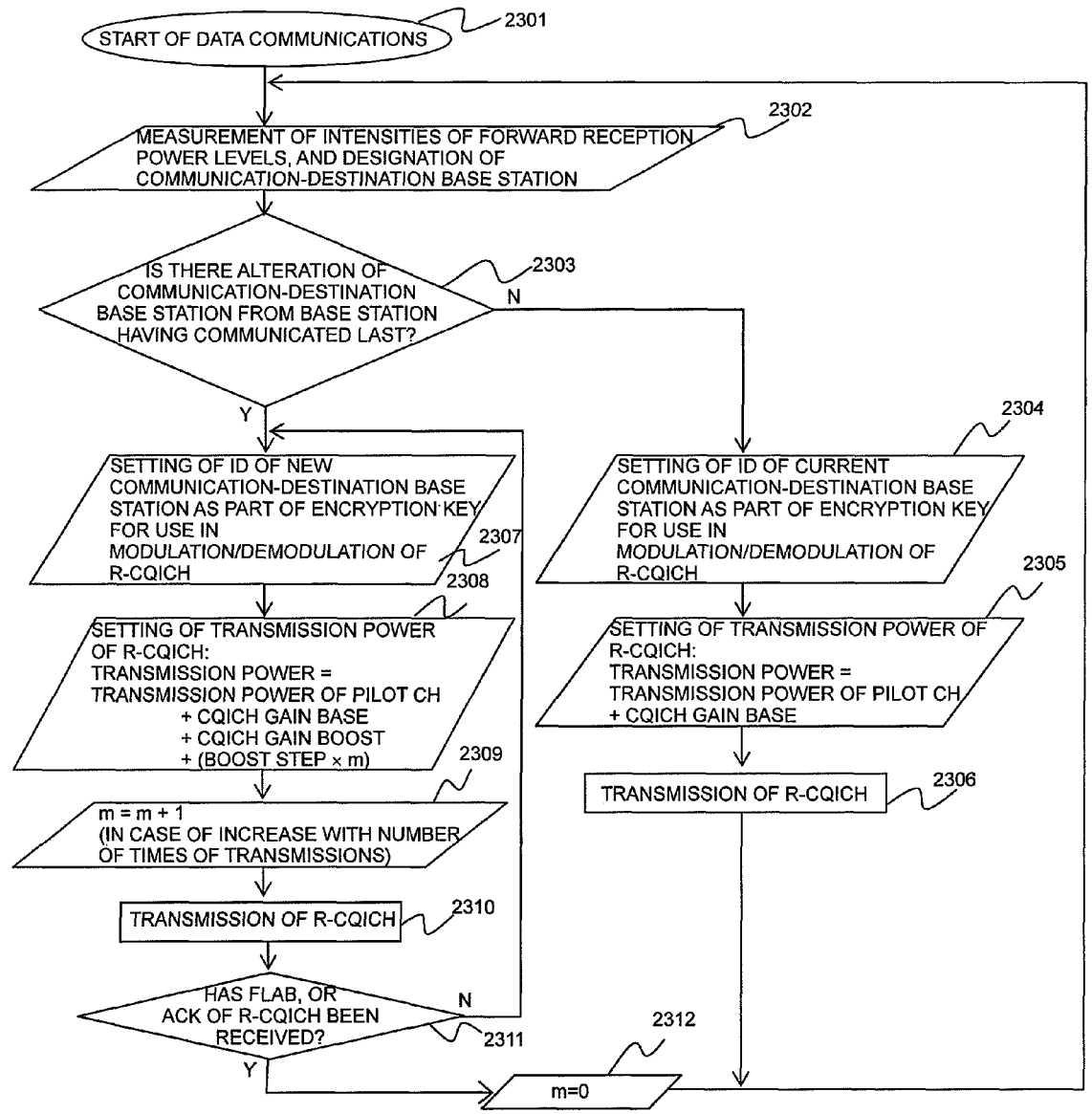
FIG. 23 is a flow chart of the operation of the AT as corresponds to the power control algorithm of the R-CQICH in the fourth embodiment of the invention.

FIG. 23 is a flow chart of the operation of an AT corresponding to the power control algorithm of the R-CQICH in the fourth embodiment of the invention.

Figure 24:
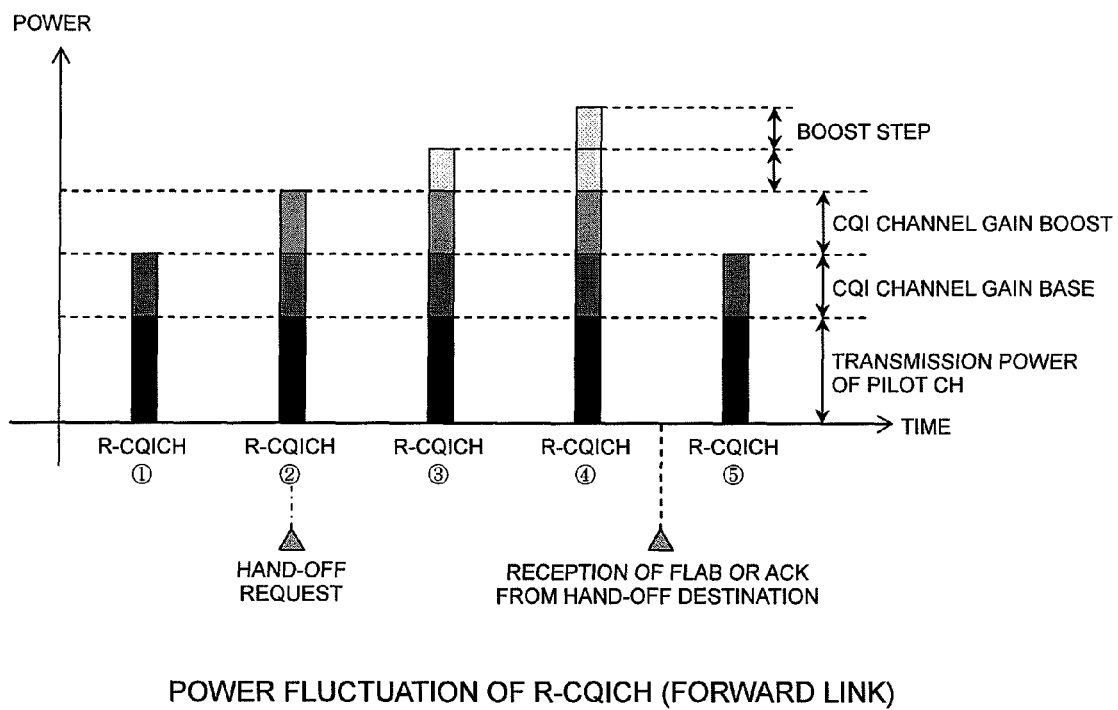
FIG. 24 is a diagram for explaining power changes which correspond to the power control algorithm of the R-CQICH in the fourth embodiment of the invention.

FIG. 24 is a diagram for explaining power changes corresponding to the power control algorithm of the R-CQICH in the fourth embodiment of the invention.

Now, the power control algorithm of the R-CQICH will be explained in conjunction with FIGS. 22, 23 and 24.

In the forward link, the radio access terminal (AT) receives control channels from a plurality of base stations, through the antenna 201 and the RF unit 202, whereby data communications are started (2301). The control Ch demodulation unit 205 measures reception power levels, and it designates the base station (BTS1) of the greatest reception power as the communication-destination base station (BTS1) of the forward link (2302). In this case, there is not any alteration of a communication-destination base station from a base station having communicated last (2303). Therefore, the control Ch modulation unit 204 bestows the ID of the designated communication-destination base station as part of a modulation encryption key, on the R-CQICH transmitted cyclically, and then transmits the R-CQICH, thereby to notify the communication destination to the base station (2201, and 2304). The transmission power of the R-CQICH (transmission power of the CQICH) on this occasion is set as in Formula 17 by the control Ch modulation unit 204 (2221, and 2305), and it is transmitted through the RF unit 202 and the antenna 201 (2306).

Transmission power of *CQICH*=Transmission power of Pilot *CH*+*CQICH* Gain Base (Formula 17)

The base station (BTS1) receives the R-CQICH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an FLAB from the scheduler 309 and through the control Ch modulation unit 304, the RF unit 302 and the antenna 301 (2202).

When, as the result of the measurement by the control Ch demodulation unit 205 (2302), the base station of the greatest forward reception power has changed from the BTS1 to the BTS2, the radio access terminal (AT) alters the designation of the communication-destination base station to the BTS2 (2303). In this case, there has been the alteration of the communication-destination base station from the base station having communicated last (2303). Therefore, the control Ch modulation unit 204 alters the ID of the designated communication-destination base station to the BTS2 and bestows the ID as part of a modulation encryption key, on the R-CQICH transmitted cyclically, and it transmits the R-CQICH, thereby to notify the communication destination to the base station (to make a hand-off request) (2203, 2204, and 2307). The transmission power of the R-CQICH (transmission power of the CQICH) on this occasion is increased in accordance with the number of times of transmissions or the lapse of a time period from the hand-off request, as in Formula 18 by way of example, by the control Ch modulation unit 204 (2222, 2308 and 2309), and it is transmitted through the RF unit 202 and the data channel (Ch) modulation unit 203 (2310).

Transmission power of *CQICH*=Transmission power of Pilot *CH*+*CQICH* Gain Base+*CQICH* Gain Boost+(Boost Step×*m*) (where *m* denotes the number of times of transmissions, *m*=0, 1, 2. . . , or a value proportional to a transmission time period) (Formula 18)

The base station (BTS1) receives the R-CQICH (2203) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an FLAB and data. The R-CQICH (2204) is also receivable at the base station (BTS2), but when the transmission power is insufficient, the signal sometimes fails to arrive at this base station, or this base station sometimes fails in the demodulation. In that case, the base station (BTS2) cannot accept the R-CQICH, and hence, it does not transmit the ACK of the R-CQICK or an FLAB, and data.

Next, the radio access terminal (AT) does not receive the response of the ACK of the R-CQICH or the FLAB from the communication-destination base station designated for the transmitted R-CQICH (2311). Therefore, it resends the R-CQICH until the response of the ACK of the R-CQICH or the FLAB comes (2205, 2206, 2207, 2208, and 2307-2310). The transmission power of the R-CQICH on this occasion is continually increased as in Formula 18 in accordance with the number of times of transmissions or the lapse of time period from the hand-off request (2223, 2224, 2308, and 2309).

The base station (BTS1) receives the R-CQICH (2205, and 2207) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit the FLAB and the data. The base station (BTS2) receives the R-CQICH (2206, and 2208) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK (2209) of the R-CQICH. Further, it transmits the FLAB from the scheduler 309 and through the control Ch modulation unit 304, the RF unit 302 and the antenna 301, after the execution and completion of a hand-off process (2210).

When the radio access terminal (AT) receives (2311) the ACK (2209) of the R-CQICH or the FLAB (2210) from the designated communication-destination base station (BTS2), the control Ch modulation unit 204 judges that the transmission of the R-CQICH has been successful. In the next R-CQICH transmission cycle (2302, and 2303), the control Ch modulation unit 204 returns the transmission power of the R-CQICH (2304) in which the communication-destination base station is designated as the BTS2, as given by Formula 17 (2225, and 2305), and it transmits the R-CQICH through the antenna 201 and the RF unit 202 (2211, and 2306). Besides, it returns the variable corresponding to the number of times of transmissions or the lapse of a time period, to the initial value thereof for the purpose of the next hand-off (2312).

(Reverse Link)

Figure 25:
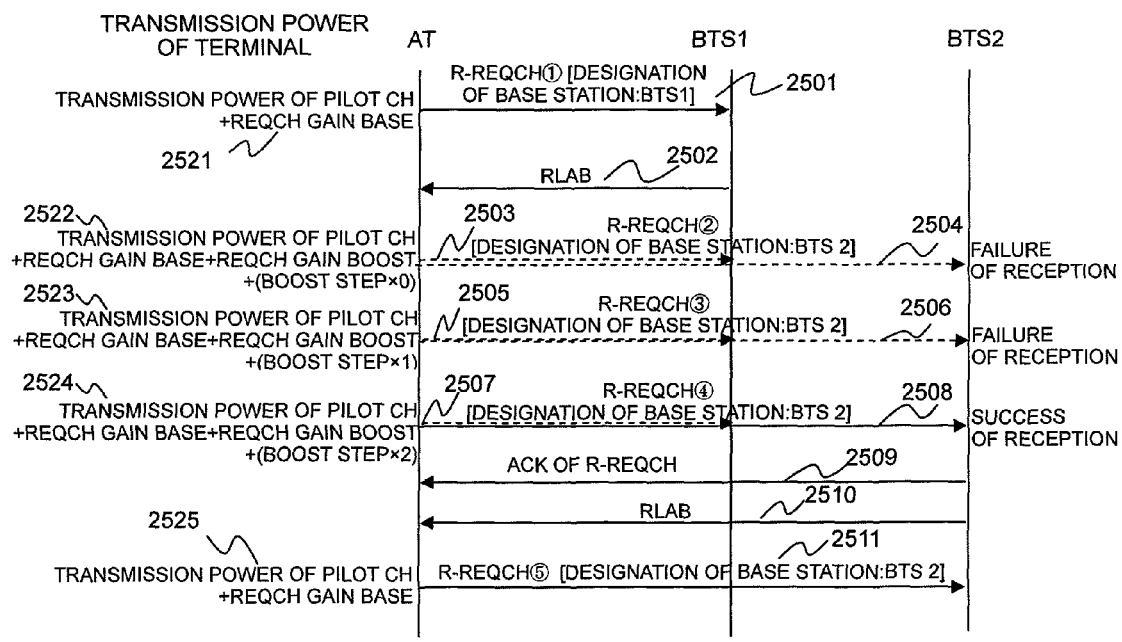
FIG. 25 is a diagram for explaining the power control algorithm of an R-REQCH in the fourth embodiment of the invention.

FIG. 25 is a diagram for explaining the power control algorithm of an R-REQCH in the fourth embodiment of the invention.

Figure 26:
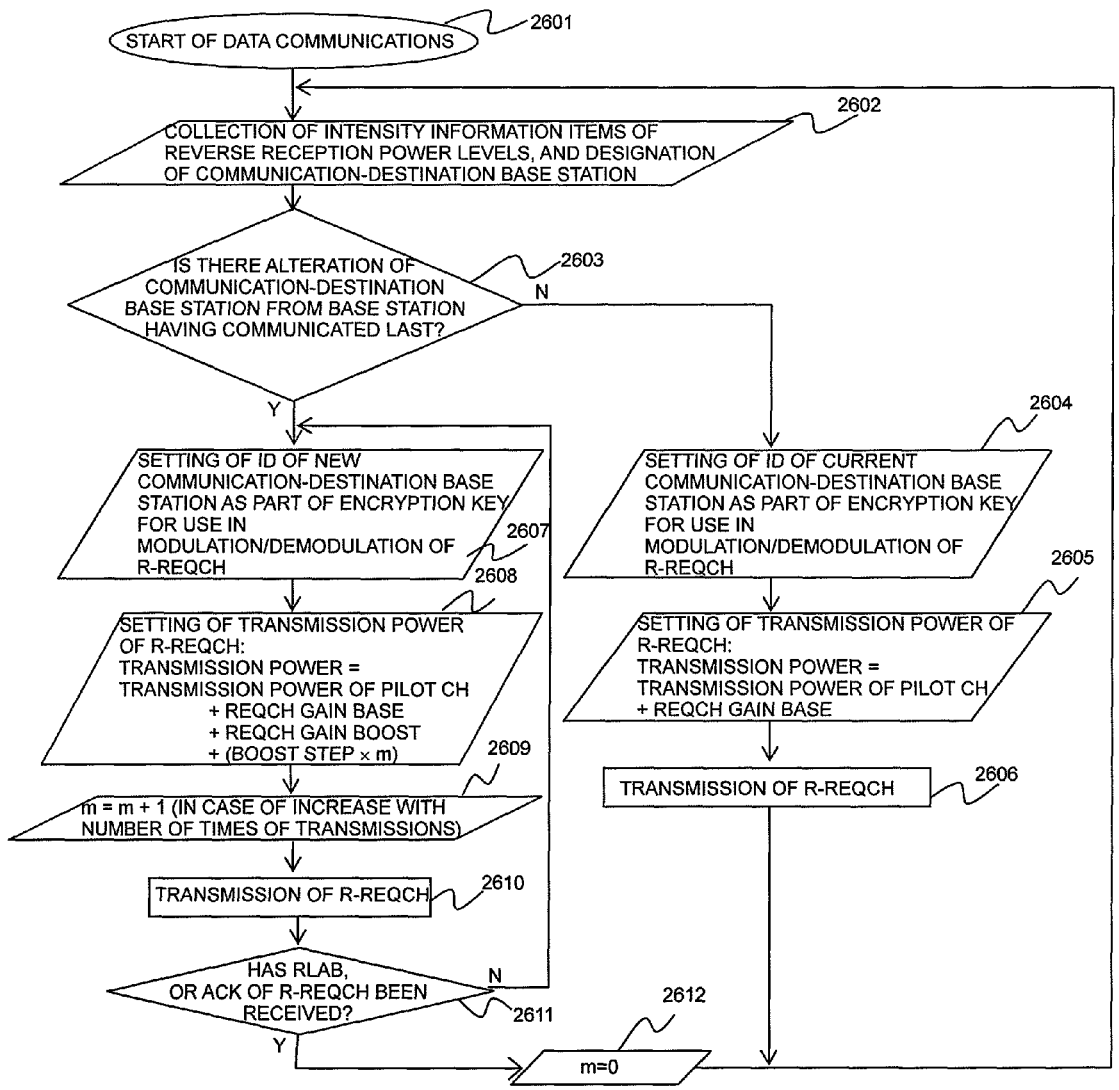
FIG. 26 is a flow chart of the operation of the AT as corresponds to the power control algorithm of the R-REQCH in the fourth embodiment of the invention.

FIG. 26 is a flow chart of the operation of an AT corresponding to the power control algorithm of the R-REQCH in the fourth embodiment of the invention.

Figure 27:
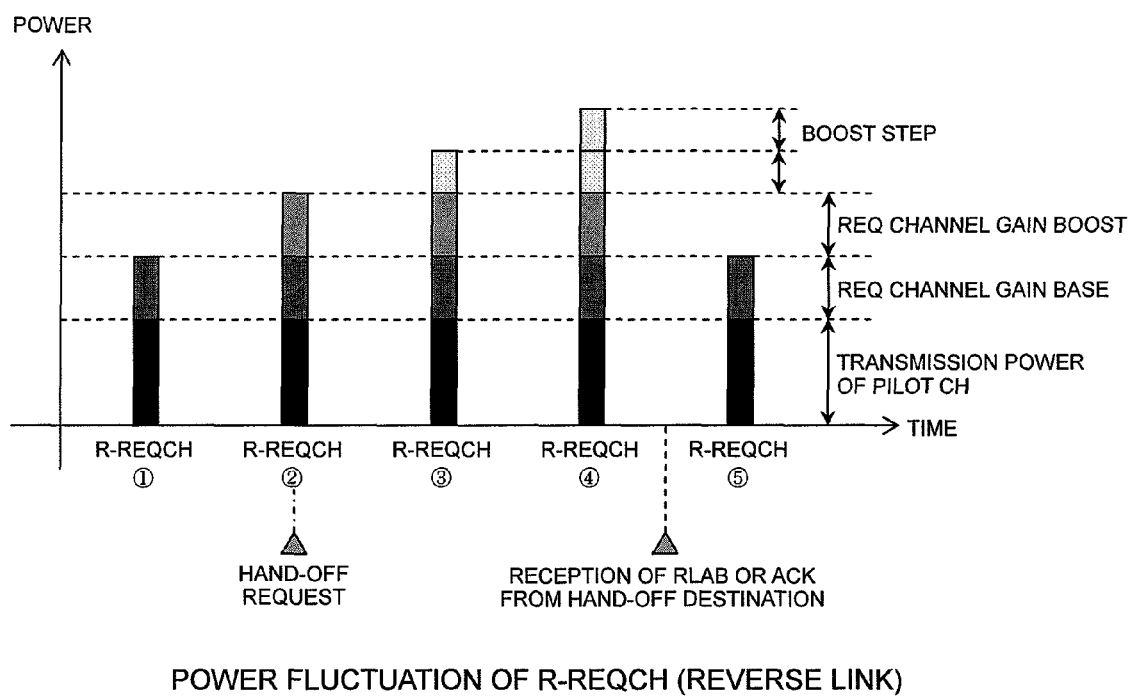
FIG. 27 is a diagram for explaining power changes which correspond to the power control algorithm of the R-REQCH in the fourth embodiment of the invention.

FIG. 27 is a diagram for explaining power changes corresponding to the power control algorithm of the R-REQCH in the fourth embodiment of the invention.

Now, the power control algorithm of the R-REQCH will be explained in conjunction with FIGS. 25, 26 and 27.

In a reverse link control, the radio access terminal (AT) accepts the intensity information items of reverse reception power levels from a plurality of base stations through the antenna 201 and the RF unit 202, whereby data communications are started (2601), and the base station (BTS1) of the greatest reception power is designated as the communication-destination base station (BTS1) of the reverse link (2602). In this case, there is not any alteration of a communication-destination base station from a base station having communicated last (2603). Therefore, the control Ch modulation unit 204 bestows the ID of the designated communication-destination base station as part of a modulation encryption key, on the R-REQCH transmitted cyclically, and then transmits the R-REQCH, thereby to notify the communication destination to the base station (2501, and 2604). The transmission power of the R-REQCH (transmission power of the REQCH) on this occasion is set as in Formula 19 by the control Ch modulation unit 204 (2521, and 2605), and the R-REQCH is transmitted through the RF unit 202 and the antenna 201 (2606).

Transmission power of $REQCH$=Transmission power of Pilot $CH$+$REQCH$ Gain Base  (Formula 19)

The base station (BTS1) receives the R-REQCH through the antenna 301 and the RF unit 302, and it succeeds in demodulation by using its own ID as an encryption key, in the control Ch demodulation unit 305, thereby to recognize that this base station has been designated as the communication-destination base station. In addition, if the base station (BTS1) is capable of communications with the particular radio access terminal (AT), it transmits an RLAB from the scheduler 309 and through the control Ch modulation unit 304, the RF unit 302 and the antenna 301 (2502).

When, as the result of the information accepted by the control Ch demodulation unit 205 (2602), the base station of the greatest reverse reception power has changed from the BTS1 to the BTS2, the radio access terminal (AT) alters the designation of the communication-destination base station to the BTS2 (2603). In this case, there has been the alteration of the communication-destination base station from the base station having communicated last (2603). Therefore, the control Ch modulation unit 204 alters the ID of the designated communication-destination base station to the BTS2 and bestows the ID as part of a modulation encryption key, on the R-REQCH transmitted cyclically, and it transmits the R-REQCH, thereby to notify the communication destination to the base station (to make a hand-off request) (2503, 2504, and 2607). The transmission power of the R-REQCH (transmission power of the REQCH) on this occasion is increased in accordance with the number of times of transmissions or the lapse of a time period from the hand-off request as in Formula 20 by way of example, by the control Ch modulation unit 204 (2522, 2608 and 2609), and the R-REQCH is transmitted through the RF unit 202 and the antenna 201 (2610).

Transmission power of $REQCH$=Transmission power of Pilot $CH$+$REQCH$ Gain Base+$REQCH$ Gain Boost+(Boost Step×$m$) (where $m$ denotes the number of times of transmissions, $m$=0, 1, 2, . . . , or a value proportional to a transmission time period)  (Formula 20)

The base station (BTS1) receives the R-REQCH (2503) through the antenna 301 and the RF unit 302, and attempts demodulation by using its own ID as an encryption key, in the control Ch demodulation unit 305. However, the base station (BTS1) fails in the demodulation on account of the disagreement of the encryption key, and it does not transmit an RLAB and data. The R-REQCH (2504) is also receivable at the base station (BTS2), but when the transmission power is insufficient, the signal sometimes fails to arrive at this base station, or this base station sometimes fails in the demodulation. In that case, the base station (BTS2) cannot accept the R-REQCH, and hence, it does not transmit the ACK of the R-REQCH or the RLAB, and the data.

Next, the radio access terminal (AT) does not receive the response of the ACK of the R-REQCH or an RLAB from the communication-destination base station designated for the transmitted R-REQCH (2611), and it therefore resends the R-REQCH (2505, 2506, 2507, 2508, 2607, and 2610) until the response of the ACK of the R-REQCH or the RLAB comes. The transmission power of the R-REQCH on this occasion is continually increased in accordance with the number of times of transmissions or the lapse of a time period from the hand-off request as in Formula 20 (2523, 2524, 2608, and 2609).

The base station (BTS1) receives the R-REQCH (2505, and 2507) through the antenna 301 and the RF unit 302, and attempts demodulation by using its own ID as the encryption key, in the control Ch demodulation unit 305. However, the base station (BTS1) fails in the demodulation on account of the disagreement of the encryption key, and it does not transmit an RLAB and data. The base station (BTS2) receives the R-REQCH (2506, and 2508) through the antenna 301 and the RF unit 302 and succeeds in the demodulation by using its own ID as the encryption key, in the control Ch demodulation unit 305, thereby to recognize that this base station has been designated as the communication-destination base station. In addition, if the base station (BTS2) is capable of communications with the particular radio access terminal (AT), it transmits the ACK (2509) of the R-REQCH. Further, it transmits the RLAB from the scheduler 309 and through the control Ch modulation unit 304, the RF unit 302 and the antenna 301, after the execution and completion of a hand-off process (2510).

When the radio access terminal (AT) receives (2611) the ACK (2509) of the R-REQCH or the RLAB (2510) from the designated communication-destination base station (BTS2), the control Ch modulation unit 204 judges that the transmission of the R-REQCH containing the hand-off request has been successful. In the next R-REQCH transmission cycle (2602, and 2603), the control Ch modulation unit 204 returns the transmission power of the R-REQCH (2604) in which the communication-destination base station is designated as the BTS2, as given by Formula 19 (2525, and 2605), and it transmits the R-REQCH through the antenna 201 and the RF unit 202 (2511, and 2606). Besides, it returns the variable corresponding to the number of times of transmissions or the lapse of a time period, to the initial value thereof for the purpose of the next hand-off (2612).

(5) Fifth Embodiment

As the fifth embodiment, both the transmission power and the transmission cycle may well be altered in accordance with the number of times of transmissions by combining the third embodiment and the fourth embodiment.

The present invention is applicable to radio communication systems in various schemes and aspects, other than the CDMA or OFDM system. Besides, although the case of employing the R-CQICH, R-REQCH, FLAB and RLAB has been described in the foregoing embodiments, the invention is not restricted to the exemplified case, but it can employ appropriate specified channels in the respective schemes and the blocks of a forward link and a reverse link.

What is claimed is:

1. A hand-off control method in a radio system, wherein a radio access terminal periodically measures a reception quality of a forward link in the forward link, the radio access terminal cyclically notifies communication-destination base station identification information of a base station which is designated in the forward link, to the base station by using a first specified channel, after transmission power of the first specified channel has been set at power which is a sum between transmission power of a pilot channel and first predetermined power, and hand-off of the forward link is performed when the base station designated anew has received a first specified channel; the method comprising:

allowing the radio access terminal to alter the communication-destination base station identification information to a second base station, in the first specified channel transmitted cyclically, and to transmit the first specified channel for making a request for the hand-off, after the transmission power of the first specified channel has been set at power which is a sum among the transmission power of the pilot channel, the first power and second predetermined power, when the base station of greatest forward reception power has changed from a first base station to the second base station as a result of the measurement of forward reception power levels of signals received from a plurality of base stations in the forward link, in which the radio access terminal increases the transmission power of the first specified channel in accordance with the number of times of transmissions or lapse of a time period from the hand-off request, and it sets a transmission cycle of the first specified channel to be shorter than a preceding transmission cycle, thereby to resend the first specified channel until the acknowledgement response of the first specified channel or the response of the block of the forward link comes;

allowing the first base station to receive the first specified channel and to judge that the communication-destination base station identification information disagrees, so that the first base station does not transmit a block of the forward link or an acknowledgement response to the first specified channel;

allowing the second base station to receive the first specified channel and to recognize that the second base station has been designated as a communication-destination base station, because of the communication-destination base station identification information of its own, so that the second base station executes a hand-off process and transmits the block of the forward link or the acknowledgement response to the first specified channel; and allowing the radio access terminal to judge that the transmission of the first specified channel containing the hand-off request has been successful, when the radio access terminal has received the block of the forward link or the acknowledgement response to the first specified channel, from the designated second base station, and to transmit the first specified channel in which the communication-destination base station identification information is designated as the second base station, in a next transmission cycle of the first specified channel, after the transmission power of the first specified channel has been returned to the power which is the sum between the transmission power of the pilot channel and the first power.

2. A hand-off control method in a radio system as defined in claim 1, wherein the radio access terminal cyclically notifies a data quantity to be transmitted in a reverse link and communication-destination base station identification information of a base station which is designated in the reverse link by the radio access terminal, to the base station in the reverse link, by using a second specified channel, after transmission power of the second specified channel has been set at power which is a sum between transmission power of a pilot channel and first predetermined power, and hand-off of the forward link is performed when the base station designated anew has received the second specified channel; comprising:

allowing the radio access terminal to alter the communication-destination base station identification information to a second base station, in the second specified channel transmitted cyclically, and to transmit the second specified channel for notifying a communication-destination base station to the base station and making a request for the hand-off, after the transmission power of the second specified channel has been set at power which is a sum among the transmission power of the pilot channel, the first power and second predetermined power, when the base station of greatest reverse reception power has changed from a first base station to the second base station as a result of the measurement of reverse reception power levels of signals received from a plurality of base stations in the reverse link, in which the radio access terminal increases the transmission power of the second specified channel in accordance with the number of times of transmissions or lapse of a time period from the hand-off request, and it sets a transmission cycle of the second specified channel to be shorter than a preceding transmission cycle, thereby to resend the second specified channel until the acknowledgement response of the second specified channel or the response of the block of the forward link comes;

allowing the first base station to receive the second specified channel and to judge that the communication-destination base station identification information disagrees, so that the first base station does not transmit a block of the reverse link or an acknowledgement response to the second specified channel;

allowing the second base station to receive the second specified channel and to recognize that the second base station has been designated as a communication-destination base station, because of the communication-destination base station identification information of its own, so that the second base station executes a hand-off process and transmits the block of the reverse link or the acknowledgement response to the second specified channel; and allowing the radio access terminal to judge that the transmission of the second specified channel containing the hand-off request has been successful, when the radio access terminal has received the block of the reverse link or the acknowledgement response to the second specified channel, from the designated second base station, and to transmit the second specified channel in which the communication-destination base station identification information is designated as the second base station, in a next transmission cycle of the second specified channel, after the transmission power of the second specified channel has been returned to the power which is the sum between the transmission power of the pilot channel and the first power, wherein in a case where the communication-destination base station designated by the forward link and the communication-destination base station designated by the reverse link are different, the hand-off is performed to the designated communication-destination base station of a predetermined one of the forward and reverse links.

3. A hand-off control method in a radio system as defined in claim 1, wherein in a forward link control, in a case where the radio access terminal does not receive the response of the block of the forward link from the communication-destination base station designated in the transmitted first specified channel, it resends the first specified channel.

4. A hand-off control method in a radio system, wherein a radio access terminal cyclically notifies a data quantity to be transmitted in a reverse link and communication-destination base station identification information of a base station which is designated in the reverse link by the radio access terminal, to the base station in the reverse link, by using a second specified channel, after transmission power of the second specified channel has been set at power which is a sum between transmission power of a pilot channel and first predetermined power, and hand-off of the forward link is performed when the base station designated anew has received the second specified channel; the method comprising:

allowing the radio access terminal to alter the communication-destination base station identification information to a second base station, in the second specified channel transmitted cyclically, and to transmit the second specified channel for notifying a communication-destination base station to the base station and making a request for the hand-off, after the transmission power of the second specified channel has been set at power which is a sum among the transmission power of the pilot channel, the first power and second predetermined power, when the base station of greatest reverse reception power has changed from a first base station to the second base station as a result of the measurement of reverse reception power levels of signals received from a plurality of base stations in the reverse link, in which the radio access terminal increases the transmission power of the second specified channel in accordance with the number of times of transmissions or lapse of a time period from the hand-off request, and it sets a transmission cycle of the second specified channel to be shorter than a preceding transmission cycle, thereby to resend the second specified channel until the acknowledgement response of the second specified channel or the response of the block of the forward link comes;

allowing the first base station to receive the second specified channel and to judge that the communication-destination base station identification information disagrees, so that the first base station does not transmit a block of the reverse link or an acknowledgement response to the second specified channel;

allowing the second base station to receive the second specified channel and to recognize that the second base station has been designated as a communication-destination base station, because of the communication-destination base station identification information of its own, so that the second base station executes a hand-off process and transmits the block of the reverse link or the acknowledgement response to the second specified channel; and allowing the radio access terminal to judge that the transmission of the second specified channel containing the hand-off request has been successful, when the radio access terminal has received the block of the reverse link or the acknowledgement response to the second specified channel, from the designated second base station, and to transmit the second specified channel in which the communication-destination base station identification information is designated as the second base station, in a next transmission cycle of the second specified channel, after the transmission power of the second specified channel has been returned to the power which is the sum between the transmission power of the pilot channel and the first power.

5. A hand-off control method in a radio system as defined in claim 4, wherein in a reverse link control, in a case where the radio access terminal does not receive the response of the block of the forward link from the communication-destination base station designated in the transmitted second specified channel, it resends the second specified channel.

* * * * *